United States Patent
Eguchi

(10) Patent No.: US 7,761,684 B2
(45) Date of Patent: Jul. 20, 2010

(54) DATA MANAGEMENT METHOD IN STORAGE POOL AND VIRTUAL VOLUME IN DKC

(75) Inventor: Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 11/298,782

(22) Filed: Dec. 8, 2005

(65) Prior Publication Data

US 2007/0079099 A1    Apr. 5, 2007

(30) Foreign Application Priority Data

Oct. 4, 2005    (JP) .............................. 2005-291005

(51) Int. Cl.
 *G06F 12/00*    (2006.01)
(52) U.S. Cl. ........................ 711/170; 711/112; 711/209
(58) Field of Classification Search ........................ None
See application file for complete search history.

(56) References Cited

U.S. PATENT DOCUMENTS

| | | | |
|---|---|---|---|
| 6,725,328 | B2 | 4/2004 | Kano et al. |
| 6,976,134 | B1 * | 12/2005 | Lolayekar et al. ............ 711/148 |
| 2005/0055603 | A1 | 3/2005 | Soran et al. |
| 2005/0108292 | A1 | 5/2005 | Burton et al. |
| 2005/0120175 | A1 | 6/2005 | Shimada et al. |
| 2006/0242378 | A1 * | 10/2006 | Kano .......................... 711/170 |
| 2006/0277386 | A1 * | 12/2006 | Eguchi ........................ 711/170 |

FOREIGN PATENT DOCUMENTS

| | | |
|---|---|---|
| EP | 1310876 A1 | 5/2003 |
| EP | 1569083 A2 | 8/2005 |
| GB | 2406406 A | 3/2005 |
| JP | 2003-015915 | 1/2003 |

OTHER PUBLICATIONS

EPO Examination Report dated Apr. 3, 2008 for European patent application EP06251125.

* cited by examiner

*Primary Examiner*—Denise Tran
(74) *Attorney, Agent, or Firm*—Townsend and Townsend and Crew LLP

(57) ABSTRACT

A storage system connected to a computer and a management computer, includes storage devices accessed by the computer, and a control unit for controlling the storage devices. A first-type logical device corresponding to a storage area set in at least one of the storage devices and a second-type logical device that is a virtual storage area are provided. The control unit sets at least two of the first-type logical devices different in a characteristic as storage areas included in a storage pool through mapping. The first-type logical device stores data by allocating a storage area of the second-type logical device to a storage area of the first-type logical device mapped to the storage pool. The characteristic of the second-type logical device can be changed by changing the allocated storage area of the second-type logical device to a storage area of another first-type logical device.

16 Claims, 37 Drawing Sheets

|  | FIRST POOL | SECOND POOL | THIRD POOL | FOURTH POOL | FOURTH POOL | FOURTH POOL |
|---|---|---|---|---|---|---|
| RANDOM | ○ |  | ○ |  |  |  |
| SEQUENTIAL |  | ○ |  |  |  |  |
| FC |  |  |  | ○ |  |  |
| ATA |  |  |  |  | ○ |  |
| EDEV |  |  |  |  |  | ○ |
| EXTERNAL (REMOTE) STORAGE DEVICE |  |  |  |  |  |  |
| TAPE LIBRARY |  |  |  |  |  |  |

POOL ATTRIBUTE TABLE 3516

| TIME | WRITE | | | | | | | | | | | |
|---|---|---|---|---|---|---|---|---|---|---|---|---|
| | IOPS (FRONT END) | | MBPS (FRONT END) | | OCCUPIED TIME | | SEQUENTIAL ACCESS TIME | | IOPS (BACK END) | | MBPS (BACK END) | |
| | MAX | AVE | MAX | AVE | MAX | AVE | MAX | AVE | MAX | AVE | MAX | AVE |
| | | | | | | | | | | | | |

(B)

| TIME | READ | | | | | | | | | | | |
|---|---|---|---|---|---|---|---|---|---|---|---|---|
| | IOPS (FRONT END) | | MBPS (FRONT END) | | OCCUPIED TIME | | SEQUENTIAL ACCESS TIME | | IOPS (BACK END) | | MBPS (BACK END) | |
| | MAX | AVE | MAX | AVE | MAX | AVE | MAX | AVE | MAX | AVE | MAX | AVE |
| | | | | | | | | | | | | |

(C)

| TIME | READ/WRITE RATIO | BACK END OCCUPIED TIME | CACHE HIT RATIO | CACHE DIRTY RATIO | SEQUENTIAL ACCESS RATIO | POOL ACCESS TIME | POOL UTILIZATION AMOUNT | POOL UTILIZATION RATIO |
|---|---|---|---|---|---|---|---|---|
| | | | | | | | | |

(D)

| TIME | OVERALL CAPACITY | POOL UTILIZATION AMOUNT | POOL UTILIZATION RATIO | POOL UTILIZATION INCREASE RATIO | READ | | | | WRITE | | | | POOL OPERATION RATIO |
|---|---|---|---|---|---|---|---|---|---|---|---|---|---|
| | | | | | IOPS | | MBPS | | IOPS | | MBPS | | |
| | | | | | MAX | AVE | MAX | AVE | MAX | AVE | MAX | AVE | |
| | | | | | | | | | | | | | |

| REAL AREA ALLOCATION SETTING | CONSULT REAL AREA ALLOCATION DEMAND TO DETERMINE NECESSARY PERFORMANCE |
|---|---|
| SEQUENTIAL SETTING | CONSULT SEQUENTIAL DEMAND TO DETERMINE NECESSARY PERFORMANCE |
| HIGH PERFORMANCE SETTING | CONSULT PERFORMANCE DEMAND TO DETERMINE NECESSARY PERFORMANCE |
| HIGH RELIABILITY SETTING | CONSULT RELIABILITY DEMAND TO DETERMINE NECESSARY PERFORMANCE |
| HIGH AVAILABILITY SETTING | CONSULT HIGH AVAILABILITY DEMAND TO DETERMINE NECESSARY PERFORMANCE |

(B) REAL AREA ALLOCATION DEMAND

|  | HIGH | MEDIUM | LOW |
|---|---|---|---|
| ENTIRE MIGRATION TO REAL AREAS | O |  |  |
| PARTIAL MIGRATION TO REAL AREAS |  | O |  |
| STORAGE POOL |  |  | O |

(C) SEQUENTIAL DEMAND

|  | HIGH | MEDIUM | LOW |
|---|---|---|---|
| STORAGE POOL | O |  |  |
| SEQUENTIAL CONFIGURATION POOL |  | O |  |
| RANDOM CONFIGURATION POOL |  |  | O |

(D) PERFORMANCE DEMAND

|  | HIGH | MEDIUM | LOW |
|---|---|---|---|
| FC | O |  |  |
| ATA | O | O |  |
| EDEV |  | O |  |
| TAPE LIBRARY |  |  | O |

(E) RELIABILITY DEMAND

|  | HIGH | MEDIUM | LOW |
|---|---|---|---|
| FC | O |  |  |
| ATA | O |  |  |
| EDEV |  | O |  |

(F) HIGH AVAILABILITY DEMAND

|  | HIGH | MEDIUM | LOW |
|---|---|---|---|
| REMOTE COPY | O |  |  |
| POOL + REMOTE COPY |  | O |  |
| NONE |  |  | O |

| LDEV | SEQUENTIAL ACCESS RATIO : HIGH | | | | | | | |
|---|---|---|---|---|---|---|---|---|
| POOL | CACHE HIT RATIO IN STORAGE POOL AREA : HIGH | | | | | | | |
| CACHE NEW ALLOCATION | WRITE HIT RATIO : HIGH | | | | WRITE HIT RATIO : LOW | | | |
| CACHE INPUT/OUTPUT | DIRTY RATIO : HIGH | | DIRTY RATIO : LOW | | DIRTY RATIO : HIGH | | DIRTY RATIO : LOW | |
| POOL | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW |
| AREA EXCEEDING LDEV SUCCESSIVE SPACE ALLOCATION THRESHOLD : PRESENT (LEVEL : HIGH) | MIGRATE TO OTHER SEQUENTIAL POOL WITH LOW ACCESS FREQUENCY OR PARTIALLY TO REAL AREAS | MIGRATE TO SEQUENTIAL POOL OR TO REAL AREAS | MIGRATE TO OTHER SEQUENTIAL POOL WITH LOW ACCESS FREQUENCY OR PARTIALLY TO REAL AREAS | KEEP AS IT IS, OR MIGRATE TO SEQUENTIAL POOL OR TO REAL AREAS | MIGRATE TO OTHER SEQUENTIAL POOL WITH LOW ACCESS FREQUENCY OR PARTIALLY TO REAL AREAS | MIGRATE TO SEQUENTIAL POOL OR TO REAL AREAS | MIGRATE TO OTHER SEQUENTIAL POOL WITH LOW ACCESS FREQUENCY OR PARTIALLY TO REAL AREAS | KEEP AS IT IS, OR MIGRATE TO SEQUENTIAL POOL OR TO REAL AREAS |
| AREA EXCEEDING LDEV SUCCESSIVE SPACE ALLOCATION THRESHOLD : PRESENT (LEVEL : LOW) | MIGRATE TO OTHER SEQUENTIAL POOL WITH LOW ACCESS FREQUENCY OR PARTIALLY TO REAL AREAS | MIGRATE TO SEQUENTIAL POOL OR PARTIALLY TO REAL AREAS | MIGRATE TO OTHER SEQUENTIAL POOL WITH LOW ACCESS FREQUENCY | KEEP AS IT IS, OR MIGRATE TO SEQUENTIAL POOL OR PARTIALLY TO REAL AREAS | MIGRATE TO OTHER SEQUENTIAL POOL WITH LOW ACCESS FREQUENCY | MIGRATE TO SEQUENTIAL POOL OR PARTIALLY TO REAL AREAS | MIGRATE TO OTHER SEQUENTIAL POOL WITH LOW ACCESS FREQUENCY | KEEP AS IT IS, OR MIGRATE TO SEQUENTIAL POOL OR PARTIALLY TO REAL AREAS |
| AREA EXCEEDING LDEV SUCCESSIVE SPACE ALLOCATION THRESHOLD : NONE | MIGRATE TO OTHER SEQUENTIAL POOL | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL |

FIG. 24B

| LDEV | SEQUENTIAL ACCESS RATIO : HIGH / CACHE HIT RATIO IN STORAGE POOL AREA : HIGH ||||||||
|---|---|---|---|---|---|---|---|---|
| POOL | WRITE HIT RATIO : HIGH |||| WRITE HIT RATIO : LOW ||||
| CACHE NEW ALLOCATION | DIRTY RATIO : HIGH || DIRTY RATIO : LOW || DIRTY RATIO : HIGH || DIRTY RATIO : LOW ||
| CACHE INPUT/OUTPUT | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW |
| AREA EXCEEDING LDEV SUCCESSIVE SPACE ALLOCATION THRESHOLD : PRESENT (LEVEL : HIGH) | MIGRATE TO REAL AREAS | MIGRATE TO REAL AREAS | MIGRATE TO REAL AREAS | MIGRATE TO REAL AREAS | MIGRATE TO REAL AREAS | MIGRATE TO REAL AREAS | MIGRATE TO REAL AREAS | MIGRATE TO REAL AREAS |
| AREA EXCEEDING LDEV SUCCESSIVE SPACE ALLOCATION THRESHOLD : PRESENT (LEVEL : LOW) | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS |
| AREA EXCEEDING LDEV SUCCESSIVE SPACE ALLOCATION THRESHOLD : NONE | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL |

| LDEV | | | | | | | | |
|---|---|---|---|---|---|---|---|---|
| POOL | | | | | | | | |
| CACHE NEW ALLOCATION | SEQUENTIAL ACCESS RATIO: HIGH / CACHE HIT RATIO IN STORAGE POOL AREA: HIGH | | | | | | | |
| | WRITE HIT RATIO: HIGH | | | | WRITE HIT RATIO: LOW | | | |
| | DIRTY RATIO: HIGH | | DIRTY RATIO: LOW | | DIRTY RATIO: HIGH | | DIRTY RATIO: LOW | |
| CACHE INPUT/OUTPUT | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW |
| POOL | | | | | | | | |
| AREA EXCEEDING LDEV SUCCESSIVE SPACE ALLOCATION THRESHOLD: PRESENT (LEVEL: HIGH) | MIGRATE TO OTHER RANDOM CONFIGURATION POOL WITH LOW ACCESS FREQUENCY OR TO REAL AREAS | MIGRATE TO RANDOM POOL OR TO REAL AREAS | MIGRATE TO OTHER RANDOM CONFIGURATION POOL WITH LOW ACCESS FREQUENCY OR TO REAL AREAS | KEEP AS IT IS, OR MIGRATE TO RANDOM POOL OR TO REAL AREAS | MIGRATE TO OTHER RANDOM CONFIGURATION POOL WITH LOW ACCESS FREQUENCY OR TO REAL AREAS | MIGRATE TO RANDOM POOL OR TO REAL AREAS | MIGRATE TO OTHER RANDOM CONFIGURATION POOL WITH LOW ACCESS FREQUENCY OR TO REAL AREAS | KEEP AS IT IS, OR MIGRATE TO RANDOM POOL OR TO REAL AREAS |
| AREA EXCEEDING LDEV SUCCESSIVE SPACE ALLOCATION THRESHOLD: PRESENT (LEVEL: LOW) | MIGRATE TO OTHER RANDOM POOL WITH LOW ACCESS FREQUENCY OR PARTIALLY TO REAL AREAS | MIGRATE TO RANDOM POOL OR PARTIALLY TO REAL AREAS | MIGRATE TO OTHER RANDOM POOL WITH LOW ACCESS FREQUENCY OR PARTIALLY TO REAL AREAS | KEEP AS IT IS, OR MIGRATE TO RANDOM POOL OR PARTIALLY TO REAL AREAS | MIGRATE TO OTHER RANDOM POOL WITH LOW ACCESS FREQUENCY OR PARTIALLY TO REAL AREAS | MIGRATE TO RANDOM POOL OR PARTIALLY TO REAL AREAS | MIGRATE TO OTHER RANDOM POOL WITH LOW ACCESS FREQUENCY OR PARTIALLY TO REAL AREAS | KEEP AS IT IS, OR MIGRATE TO RANDOM POOL PARTIALLY TO REAL AREAS |
| AREA EXCEEDING LDEV SUCCESSIVE SPACE ALLOCATION THRESHOLD: NONE | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL |

FIG. 24C

| LDEV | | SEQUENTIAL ACCESS RATIO: HIGH | | | | | | | |
|---|---|---|---|---|---|---|---|---|---|
| POOL | | CACHE HIT RATIO IN STORAGE POOL AREA: HIGH | | | | | | | |
| CACHE NEW ALLOCATION | | WRITE HIT RATIO: HIGH | | | | WRITE HIT RATIO: LOW | | | |
| CACHE INPUT/OUTPUT | | DIRTY RATIO: HIGH | | DIRTY RATIO: LOW | | DIRTY RATIO: HIGH | | DIRTY RATIO: LOW | |
| | POOL | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW |
| AREA EXCEEDING LDEV SUCCESSIVE SPACE ALLOCATION THRESHOLD: PRESENT (LEVEL: HIGH) | | MIGRATE TO REAL AREAS | MIGRATE TO REAL AREAS | MIGRATE TO REAL AREAS | MIGRATE TO REAL AREAS | MIGRATE TO REAL AREAS | MIGRATE TO REAL AREAS | MIGRATE TO REAL AREAS | MIGRATE TO REAL AREAS |
| AREA EXCEEDING LDEV SUCCESSIVE SPACE ALLOCATION THRESHOLD: PRESENT (LEVEL: LOW) | | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS | MIGRATE PARTIALLY TO REAL AREAS |
| AREA EXCEEDING LDEV SUCCESSIVE SPACE ALLOCATION THRESHOLD: NONE | | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL |

FIG. 24D

| LDEV | | | | | | | | | |
|---|---|---|---|---|---|---|---|---|---|
| POOL | | | | | | | | | |
| | | SEQUENTIAL ACCESS RATIO: HIGH | | | | | | | |
| | | CACHE HIT RATIO IN STORAGE POOL AREA: HIGH | | | | | | | |
| CACHE NEW ALLOCATION | | WRITE HIT RATIO: HIGH | | | | WRITE HIT RATIO: LOW | | | |
| | | DIRTY RATIO: HIGH | | DIRTY RATIO: LOW | | DIRTY RATIO: HIGH | | DIRTY RATIO: LOW | |
| CACHE INPUT/OUTPUT | | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW | POOL ACCESS TIME UTILIZATION RATIO: HIGH | POOL ACCESS TIME UTILIZATION RATIO: LOW |
| POOL | | MIGRATE TO OTHER SEQUENTIAL POOL WITH LOW ACCESS FREQUENCY OR PARTIALLY TO REAL AREAS OF ATA/EDEV | MIGRATE TO SEQUENTIAL POOL OR TO REAL AREAS OF ATA/EDEV | MIGRATE TO OTHER SEQUENTIAL POOL WITH LOW ACCESS FREQUENCY OR PARTIALLY TO REAL AREAS OF ATA/EDEV | KEEP AS IT IS, OR MIGRATE TO SEQUENTIAL POOL OR TO REAL AREAS OF ATA/EDEV | MIGRATE TO OTHER SEQUENTIAL POOL WITH LOW ACCESS FREQUENCY OR PARTIALLY TO REAL AREAS OF ATA/EDEV | MIGRATE TO SEQUENTIAL POOL OR TO REAL AREAS OF ATA/EDEV | MIGRATE TO OTHER SEQUENTIAL POOL WITH LOW ACCESS FREQUENCY OR PARTIALLY TO REAL AREAS OF ATA/EDEV | KEEP AS IT IS, OR MIGRATE TO SEQUENTIAL POOL OR TO REAL AREAS OF ATA/EDEV |
| AREA EXCEEDING LDEV SUCCESSIVE SPACE ALLOCATION THRESHOLD: PRESENT (LEVEL: HIGH) | | MIGRATE TO OTHER SEQUENTIAL POOL WITH LOW ACCESS FREQUENCY OR PARTIALLY TO REAL AREAS OF ATA/EDEV | MIGRATE TO SEQUENTIAL POOL OR TO REAL AREAS OF ATA/EDEV | MIGRATE TO OTHER SEQUENTIAL POOL WITH LOW ACCESS FREQUENCY OR PARTIALLY TO REAL AREAS OF ATA/EDEV | KEEP AS IT IS, OR MIGRATE TO SEQUENTIAL POOL OR TO REAL AREAS OF ATA/EDEV | MIGRATE TO OTHER SEQUENTIAL POOL WITH LOW ACCESS FREQUENCY OR PARTIALLY TO REAL AREAS OF ATA/EDEV | MIGRATE TO SEQUENTIAL POOL OR TO REAL AREAS OF ATA/EDEV | MIGRATE TO OTHER SEQUENTIAL POOL WITH LOW ACCESS FREQUENCY OR PARTIALLY TO REAL AREAS OF ATA/EDEV | KEEP AS IT IS, OR MIGRATE TO SEQUENTIAL POOL OR TO REAL AREAS OF ATA/EDEV |
| AREA EXCEEDING LDEV SUCCESSIVE SPACE ALLOCATION THRESHOLD: PRESENT (LEVEL: LOW) | | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY OR PARTIALLY TO REAL AREAS OF ATA/EDEV | KEEP AS IT IS OR MIGRATE TO SEQUENTIAL POOL | MIGRATE TO OTHER SEQUENTIAL POOL WITH LOW ACCESS FREQUENCY OR PARTIALLY TO REAL AREAS OF ATA/EDEV | MIGRATE TO SEQUENTIAL POOL | MIGRATE TO OTHER SEQUENTIAL POOL WITH LOW ACCESS FREQUENCY OR PARTIALLY TO REAL AREAS OF ATA/EDEV | KEEP AS IT IS, OR MIGRATE TO SEQUENTIAL POOL OR TO REAL AREAS OF ATA/EDEV |
| AREA EXCEEDING LDEV SUCCESSIVE SPACE ALLOCATION THRESHOLD: NONE | | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL |

FIG. 24E

| LDEV | SEQUENTIAL ACCESS RATIO : HIGH | | | | | | | |
|---|---|---|---|---|---|---|---|---|
| POOL | CACHE HIT RATIO IN STORAGE POOL AREA : HIGH | | | | | | | |
| CACHE NEW ALLOCATION | WRITE HIT RATIO : HIGH | | | | WRITE HIT RATIO : LOW | | | |
| CACHE INPUT/OUTPUT | DIRTY RATIO : HIGH | | DIRTY RATIO : LOW | | DIRTY RATIO : HIGH | | DIRTY RATIO : LOW | |
| POOL | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW |
| AREA EXCEEDING LDEV SUCCESSIVE SPACE ALLOCATION THRESHOLD : PRESENT (LEVEL : HIGH) | MIGRATE TO REAL AREAS OF ATA / EDEV | MIGRATE TO REAL AREAS OF ATA / EDEV | MIGRATE TO REAL AREAS OF ATA / EDEV | MIGRATE TO REAL AREAS OF ATA / EDEV | MIGRATE TO REAL AREAS OF ATA / EDEV | MIGRATE TO REAL AREAS OF ATA / EDEV | MIGRATE TO REAL AREAS OF ATA / EDEV | MIGRATE TO REAL AREAS OF ATA / EDEV |
| AREA EXCEEDING LDEV SUCCESSIVE SPACE ALLOCATION THRESHOLD : PRESENT (LEVEL : LOW) | MIGRATE PARTIALLY TO REAL AREAS OF ATA / EDEV | MIGRATE PARTIALLY TO REAL AREAS OF ATA / EDEV | MIGRATE PARTIALLY TO REAL AREAS OF ATA / EDEV | MIGRATE PARTIALLY TO REAL AREAS OF ATA / EDEV | MIGRATE PARTIALLY TO REAL AREAS OF ATA / EDEV | MIGRATE PARTIALLY TO REAL AREAS OF ATA / EDEV | MIGRATE PARTIALLY TO REAL AREAS OF ATA / EDEV | MIGRATE PARTIALLY TO REAL AREAS OF ATA / EDEV |
| AREA EXCEEDING LDEV SUCCESSIVE SPACE ALLOCATION THRESHOLD : NONE | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL | MIGRATE TO OTHER SEQUENTIAL POOL WITH LOW ACCESS FREQUENCY | MIGRATE TO SEQUENTIAL POOL | MIGRATE TO OTHER SEQUENTIAL POOL WITH LOW ACCESS FREQUENCY | KEEP AS IT IS OR MIGRATE TO SEQUENTIAL POOL |

FIG. 24F

| LDEV | SEQUENTIAL ACCESS RATIO : HIGH | | | | | | | |
|---|---|---|---|---|---|---|---|---|
| POOL | CACHE HIT RATIO IN STORAGE POOL AREA : HIGH | | | | | | | |
| CACHE NEW ALLOCATION | WRITE HIT RATIO : HIGH | | | | WRITE HIT RATIO : LOW | | | |
| CACHE INPUT/OUTPUT | DIRTY RATIO : HIGH | | DIRTY RATIO : LOW | | DIRTY RATIO : HIGH | | DIRTY RATIO : LOW | |
| POOL | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW |
| AREA EXCEEDING LDEV SUCCESSIVE SPACE ALLOCATION THRESHOLD : PRESENT (LEVEL : HIGH) | MIGRATE TO OTHER RANDOM POOL WITH LOW ACCESS FREQUENCY OR TO REAL AREAS OF ATA / EDEV | MIGRATE TO RANDOM POOL OR TO REAL AREAS OF ATA / EDEV | MIGRATE TO OTHER RANDOM POOL WITH LOW ACCESS FREQUENCY OR PARTIALLY TO REAL AREAS OF ATA / EDEV | KEEP AS IT IS, OR MIGRATE TO RANDOM POOL OR PARTIALLY TO REAL AREAS OF ATA / EDEV | MIGRATE TO OTHER RANDOM POOL WITH LOW ACCESS FREQUENCY OR TO REAL AREAS OF ATA / EDEV | MIGRATE TO RANDOM POOL OR TO REAL AREAS OF ATA / EDEV | MIGRATE TO OTHER RANDOM POOL WITH LOW ACCESS FREQUENCY OR PARTIALLY TO REAL AREAS OF ATA / EDEV | KEEP AS IT IS, OR MIGRATE TO RANDOM POOL OR PARTIALLY TO REAL AREAS OF ATA / EDEV |
| AREA EXCEEDING LDEV SUCCESSIVE SPACE ALLOCATION THRESHOLD : PRESENT (LEVEL : LOW) | MIGRATE TO OTHER RANDOM POOL WITH LOW ACCESS FREQUENCY OR PARTIALLY TO REAL AREAS OF ATA / EDEV | MIGRATE TO RANDOM POOL OR PARTIALLY TO REAL AREAS OF ATA / EDEV | MIGRATE TO OTHER RANDOM POOL WITH LOW ACCESS FREQUENCY OR PARTIALLY TO REAL AREAS OF ATA / EDEV | KEEP AS IT IS, OR MIGRATE TO RANDOM POOL OR PARTIALLY TO REAL AREAS OF ATA / EDEV | MIGRATE TO OTHER RANDOM POOL WITH LOW ACCESS FREQUENCY OR PARTIALLY TO REAL AREAS OF ATA / EDEV | MIGRATE TO RANDOM POOL OR PARTIALLY TO REAL AREAS OF ATA / EDEV | MIGRATE TO OTHER RANDOM POOL WITH LOW ACCESS FREQUENCY OR PARTIALLY TO REAL AREAS OF ATA / EDEV | KEEP AS IT IS, OR MIGRATE TO RANDOM POOL OR PARTIALLY TO REAL AREAS OF ATA / EDEV |
| AREA EXCEEDING LDEV SUCCESSIVE SPACE ALLOCATION THRESHOLD : NONE | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL |

FIG. 24G

| LDEV POOL | | | | | | | | | |
|---|---|---|---|---|---|---|---|---|---|
| CACHE NEW ALLOCATION | | SEQUENTIAL ACCESS RATIO : HIGH | | | | | | | |
| | | CACHE HIT RATIO IN STORAGE POOL AREA : HIGH | | | | | | | |
| | | WRITE HIT RATIO : HIGH | | | | WRITE HIT RATIO : LOW | | | |
| | | DIRTY RATIO : HIGH | | DIRTY RATIO : LOW | | DIRTY RATIO : HIGH | | DIRTY RATIO : LOW | |
| CACHE INPUT/OUTPUT | | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW | POOL ACCESS TIME UTILIZATION RATIO : HIGH | POOL ACCESS TIME UTILIZATION RATIO : LOW |
| POOL | | MIGRATE TO REAL AREAS OF ATA/EDEV | MIGRATE TO RANDOM POOL | MIGRATE TO REAL AREAS OF ATA/EDEV | MIGRATE TO REAL AREAS OF ATA/EDEV | MIGRATE TO REAL AREAS OF ATA/EDEV | MIGRATE TO RANDOM POOL | MIGRATE TO REAL AREAS OF ATA/EDEV | MIGRATE TO REAL AREAS OF ATA/EDEV |
| AREA EXCEEDING LDEV SUCCESSIVE SPACE ALLOCATION THRESHOLD : PRESENT (LEVEL : HIGH) | | MIGRATE PARTIALLY TO REAL AREAS OF ATA/EDEV | MIGRATE PARTIALLY TO REAL AREAS OF ATA/EDEV | MIGRATE PARTIALLY TO REAL AREAS OF ATA/EDEV | MIGRATE PARTIALLY TO REAL AREAS OF ATA/EDEV | MIGRATE PARTIALLY TO REAL AREAS OF ATA/EDEV | MIGRATE PARTIALLY TO REAL AREAS OF ATA/EDEV | MIGRATE PARTIALLY TO REAL AREAS OF ATA/EDEV | MIGRATE PARTIALLY TO REAL AREAS OF ATA/EDEV |
| AREA EXCEEDING LDEV SUCCESSIVE SPACE ALLOCATION THRESHOLD : PRESENT (LEVEL : LOW) | | MIGRATE TO OTHER RANDOM POOL WITH LOW ACCESS FREQUENCY | MIGRATE TO OTHER RANDOM POOL WITH LOW ACCESS FREQUENCY | KEEP AS IT IS OR MIGRATE TO RANDOM POOL | MIGRATE TO OTHER RANDOM POOL WITH LOW ACCESS FREQUENCY | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | MIGRATE PARTIALLY TO REAL AREAS OF ATA/EDEV |
| AREA EXCEEDING LDEV SUCCESSIVE SPACE ALLOCATION THRESHOLD : NONE | | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | MIGRATE TO RANDOM POOL | MIGRATE TO OTHER RANDOM POOL WITH LOW ACCESS FREQUENCY | KEEP AS IT IS OR MIGRATE TO RANDOM POOL |

FIG. 24H

DATA MANAGEMENT METHOD IN STORAGE POOL AND VIRTUAL VOLUME IN DKC

CLAIM OF PRIORITY

The present application claims priority from Japanese application P2005-291005 filed on Oct. 4, 2005, the content of which is hereby incorporated by reference into this application.

BACKGROUND

This invention relates to a storage system to store data used by computers and more specifically to a storage system that allows the capacity of storage accessed by computers to be changed.

The storage capacity of a conventional storage system depends on the capacity of disk drives or other similar physical devices installed in the system. Therefore, when required to have a large storage capacity, a storage system has to be equipped with an accordingly large number of physical devices. While there is a demand for a large storage capacity, users also make a conflicting demand for reduction in cost and size.

Here comes an urgent need to develop a mechanism that enables a storage system to change its storage capacity dynamically. One of methods known to be useful in building such a storage system is automatic storage device capacity expansion (see JP 2003-15915 A, for example). In this method, a logical block address in a read or write I/O request at which a host computer accesses a logical volume of a storage device is monitored. Then, with the obtained logical block address as the key, the storage area of the logical volume is dynamically expanded. This method also allows a command unit of a host computer to send a logical volume capacity reduction/expansion instruction to a volume server, which then reduces/expands the storage area of the logical volume.

The prior art publication discloses that the capacity of a device accessed by a host computer can be changed dynamically, but not how the technique is applied. In particular, the prior art publication does not disclose how logical volumes are set in virtual volumes and how the set volumes are to be utilized in the case where virtual volumes are utilized for a storage system.

This invention has been made in view of the above problems, and it is therefore an object of this invention to provide a computer system capable of changing the storage capacity of a storage system that utilizes virtual volumes.

SUMMARY

This invention provides a storage system connected to a computer and a management computer, that includes storage devices accessed by the computer; and a control unit for controlling the storage devices, in which there are set a first-type logical device that is a storage area corresponding to a storage area set in at least one of the storage devices, and a second-type logical device that is a virtual storage area, and the control unit: sets at least two of the first-type logical devices different in a characteristic as storage areas included in a storage pool through mapping; sets the first-type logical device to be able to store data by allocating a storage area of the second-type logical device to a storage area of the first-type logical device mapped to the storage pool; sets the second-type logical device to be accessible by the computer; and changes a characteristic of the second-type logical device by changing the allocated storage area of the second-type logical device to a storage area of another first-type logical device.

According to this invention, the storage areas of virtual volumes accessed by computers can be changed dynamically by changing allocation of logical volumes to the virtual volumes and thus giving the virtual volumes different storage areas. This makes it possible to set virtual volumes whose capacity exceeds the total storage capacity of physical devices provided in a storage system, and enhances the degree of freedom to access data in a computer system.

BRIEF DESCRIPTION OF THE DRAWINGS

FIG. 11 is an explanatory diagram of a pool characteristic table according to the embodiment of this invention.

FIG. 22 is an explanatory diagram of an example of monitoring data according to the embodiment of this invention.

FIG. 23 is an explanatory diagram of planning data according to the embodiment of this invention.

FIG. 24A is an explanatory diagram of an example of the planning data according to the embodiment of this invention.

FIG. 24B is an explanatory diagram of an example of the planning data according to the embodiment of this invention.

FIG. 24C is an explanatory diagram of an example of the planning data according to the embodiment of this invention.

FIG. 24D is an explanatory diagram of an example of the planning data according to the embodiment of this invention.

FIG. 24E is an explanatory diagram of an example of the planning data according to the embodiment of this invention.

FIG. 24F is an explanatory diagram of an example of the planning data according to the embodiment of this invention.

FIG. 24G is an explanatory diagram of an example of the planning data according to the embodiment of this invention.

FIG. 24H is an explanatory diagram of an example of the planning data according to the embodiment of this invention.

DETAILED DESCRIPTION OF THE PREFERRED EMBODIMENTS

An embodiment of this invention will be described below with reference to the accompanying drawings.

Figure 1:
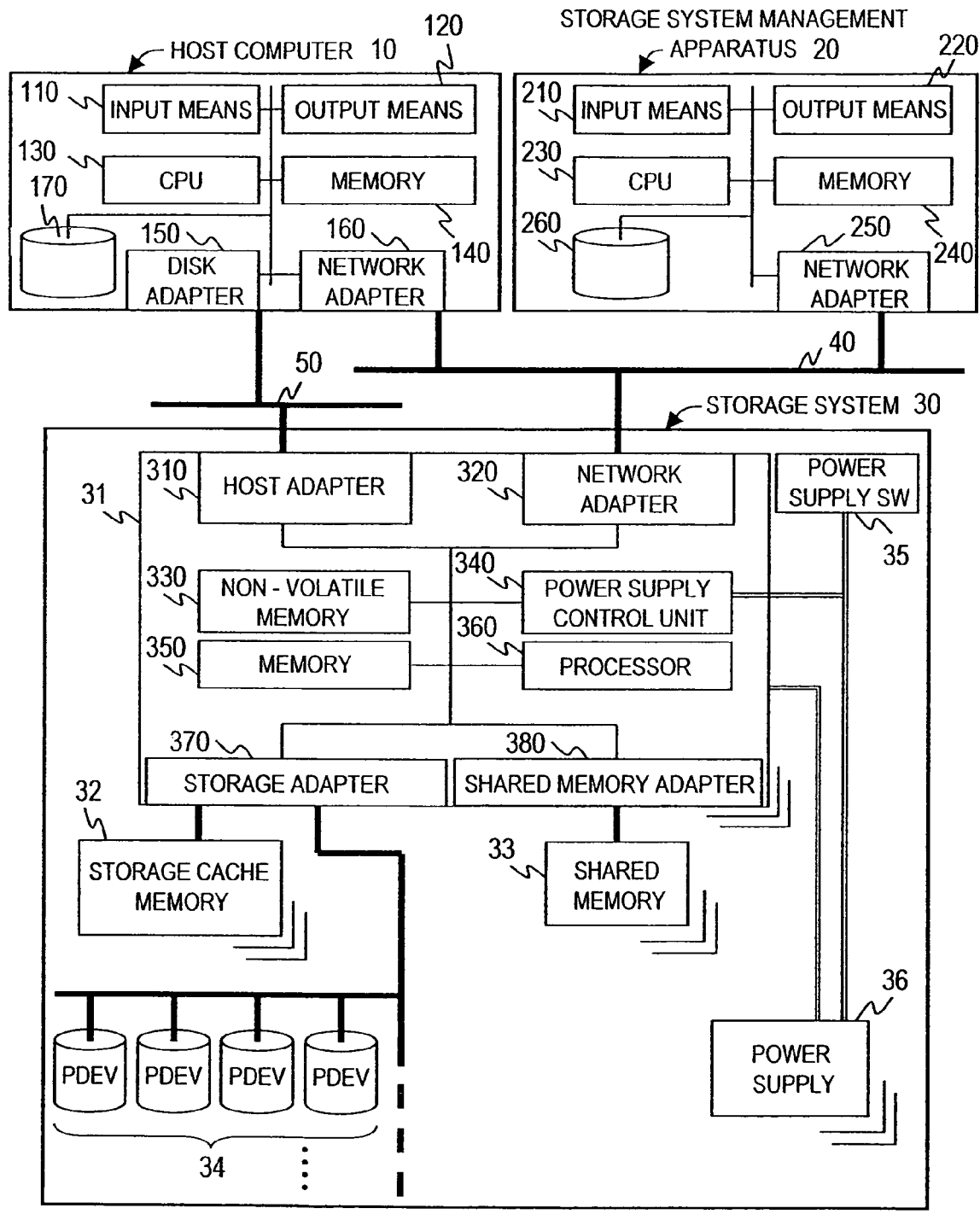
FIG. 1 is a configuration block diagram of a computer system according to an embodiment of this invention.

FIG. 1 is a configuration block diagram of a computer system according to an embodiment of this invention.

The computer system of this embodiment has a host computer 10 and a storage system management apparatus 20 which are connected to a storage system 30.

The host computer 10 accesses data in the storage area of the storage system 30. The storage system management apparatus 20 manages the configuration of the storage area of the storage system 30. The storage system 30 has physical devices 34 and stores data in storage areas set in the physical devices 34.

The host computer 10 has an input unit 110, an output unit 120, a CPU 130, a memory 140, a disk adapter 150, a network adapter 160 and a disk drive 170.

The input unit 110 accepts an input made by an administrator or the like who operates the host computer 10. The input unit 110 is, for example, a keyboard. The output unit 120 is a unit that displays the state and setting items of the host computer 10. The output unit 120 is, for example, a display device.

The CPU 130 reads a program stored in the disk drive 170 and loads the program into the memory 140 to execute processing prescribed in the program. The memory 140 is, for example, a RAM, and stores a program, data, and the like.

The disk adapter 150 is connected to the storage system 30 via a storage network 50 to exchange data with the storage system 30. A protocol suitable for data transfer (Fibre Channel, for example) is employed for the storage network 50.

The network adapter 160 exchanges data with the storage system management apparatus 20 or with the storage system 30 via a management network 40. The management network 40 is, for example, Ethernet.

The disk drive 170 is, for example, a hard disk, and stores data and a program.

The storage system management apparatus 20 has an input unit 210, an output unit 220, a CPU 230, a memory 240, a network adapter 250 and a disk drive 260.

The input unit 210 accepts an input made by an administrator or the like who operates the storage system management apparatus 20. The input unit 210 is, for example, a keyboard. The output unit 220 is a unit that displays the state and setting items of the storage system management apparatus 20. The output unit 220 is, for example, a display device.

The CPU 230 reads a program stored in the disk drive 260 and loads the program into the memory 240 to execute processing prescribed in the program. The memory 240 is, for example, a RAM, and stores a program, data, and the like.

The network adapter 250 exchanges data with the host computer 10 or with the storage system 30 via the management network 40.

The disk drive 260 is, for example, a hard disk, and stores data and a program.

The storage system 30 has a control unit 31, a storage cache memory 32, a shared memory 33, the physical devices (PDEVs) 34, a power supply switch 35 and a power supply 36.

The control unit 31 controls which data is to be stored in which storage area set in the PDEVs 34.

The storage cache memory 32 temporarily stores data to be read out or written in the PDEVs 34. The shared memory 33 stores configuration information of the control unit 31 and the PDEVs 34.

The PDEVs 34 include plural disk devices.

The power supply 36 supplies electric power to each component of the storage system 30. The power supply switch 35 is a switch to turn on/off a supply of electric power from the power supply 36.

The control unit 31 has a host adapter 310, a network adapter 320, a non-volatile memory 330, a power supply control unit 340, a memory 350, a processor 360, a storage adapter 370 and a shared memory adapter 380.

The host adapter 310 exchanges data with the host computer 10 via the storage network 50. The network adapter 320 exchanges data with the host computer 10 or with the storage system management apparatus 20 via the management network 40.

The non-volatile memory 330 is, for example, a hard disk or a flash memory, and stores a program run on the control unit 31, configuration information, and the like.

The power supply control unit 340 controls electric power supplied from the power supply 36.

The memory 350 is, for example, a RAM, and stores a program, data, and the like.

The processor 360 reads a program stored in the non-volatile memory 330 and loads the program into the memory 350 to execute processing prescribed in the program.

The storage adapter 370 exchanges data with the PDEVs 34 and with the storage cache memory 32.

The shared memory adapter 380 exchanges data with the shared memory 33.

A storage pool according to this embodiment is described next.

Figure 2:
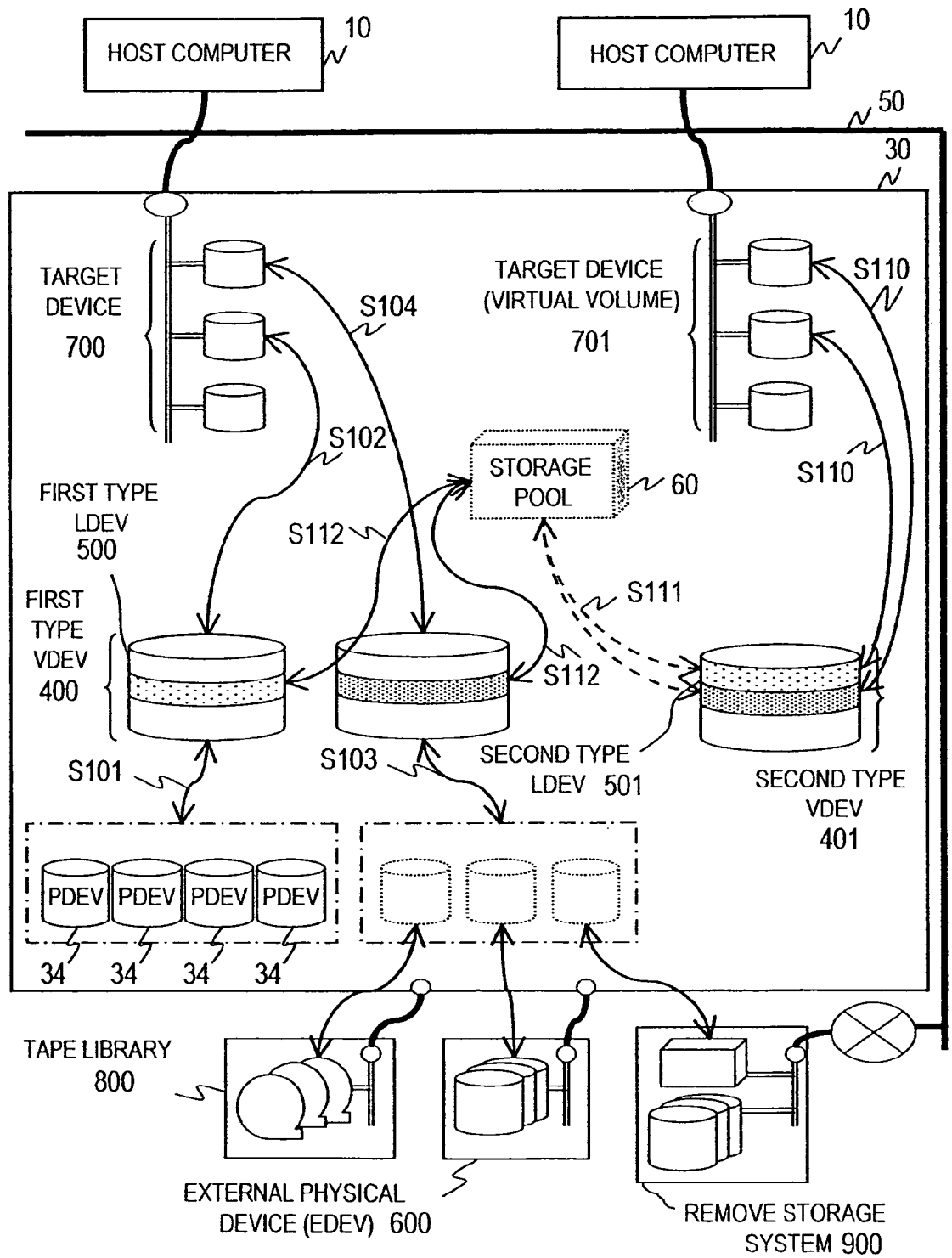
FIG. 2 is an explanatory diagram of a storage area in the computer system according to the embodiment of this invention.

FIG. 2 is an explanatory diagram of a storage area in the computer system according to this embodiment.

The host computer 10 accesses a storage area at a volume of the storage system 30. One of LDEVs is set to the volume.

In the storage system 30, the PDEVs 34 take a RAID configuration to constitute a RAID group. The RAID group constitutes a virtual device (VDEV) 400 (S101). The VDEV 400 is divided into plural logical devices (LDEVs) 500 which are storage areas.

The VDEV constituted of the PDEVs 34 will hereinafter be called as a "first-type VDEV". LDEVs contained in the first-type VDEV will hereinafter be called as "first-type LDEVs".

Access from the host computer 10 is directed at a volume of the storage system 30. A volume recognized by the host computer 10 is called as a "target device". A target device 700 is set in a volume containing the first-type LDEV 500 by defining a path to the host computer 10 (S102).

An external device connected to the storage system 30 from the outside, for example, an external physical device (EDEV) 600, a tape library 800 or a remote storage system 900, may be treated like the PDEV 34. That is, plural external devices take a RAID configuration to constitute plural first-type VDEVs (S103). The first-type VDEVs 400 are divided into one or more first-type LDEVs 500, which are storage areas. A path to the host computer 10 is set to the first-type LDEV 500, thereby setting the target device 700 (S104).

A second-type VDEV 401 may be set in the storage system 30. The second-type VDEV is, unlike the first-type VDEV constituted of the PDEVs 34, a virtual device that has an address and an area but not areas corresponding to the PDEVs 34. Instead, the second-type VDEV can have a corresponding cache memory area. The second-type VDEV 401 is broken into one or more LDEVs as storage areas, which are called as second-type LDEVs 501.

A target device 701 is set by setting a path to the host computer 10 to the second-type LDEV 501 (S110). This target device is called as a virtual volume.

The second-type VDEV and the second-type LDEVs are not physical entities. In order for the host computer 10 to be able to use the second-type VDEV and LDEVs, the second-type LDEVs have to be associated with a storage pool. The storage pool is an assembly constituted of the first-type LDEVs. By being allocated to the storage areas of the second LDEVs 401 as the virtual devices, namely, the first-type LDEV, the second LDEVs 401 can be used as the storage areas of the first-type LDEV. That is, when setting as the second LDEVs, by changing the allocation of the second LDEV and the storage pool, the characteristics of the storage areas of the target device (for example, the capacity access characteristics, etc.) can be changed.

A storage pool is built by setting the first-type LDEV 500 as an attribute of the storage pool (S112). The first-type LDEV 500 set to the storage pool is associated with the second-type LDEV 501 and the address is mapped (S111). This enables the host computer 10 to use second-type LDEVs, which are storage areas of a virtual volume. Mapping first-type LDEVs and second-type LDEVs differently makes a change in storage area of a virtual volume.

Hereinafter, a reference to "VDEV" without a mention of a type includes first-type VDEV and second-type VDEV both. Similarly, a reference to "LDEV" without a mention of a type includes first-type LDEV and second-type LDEV both.

Figure 3:
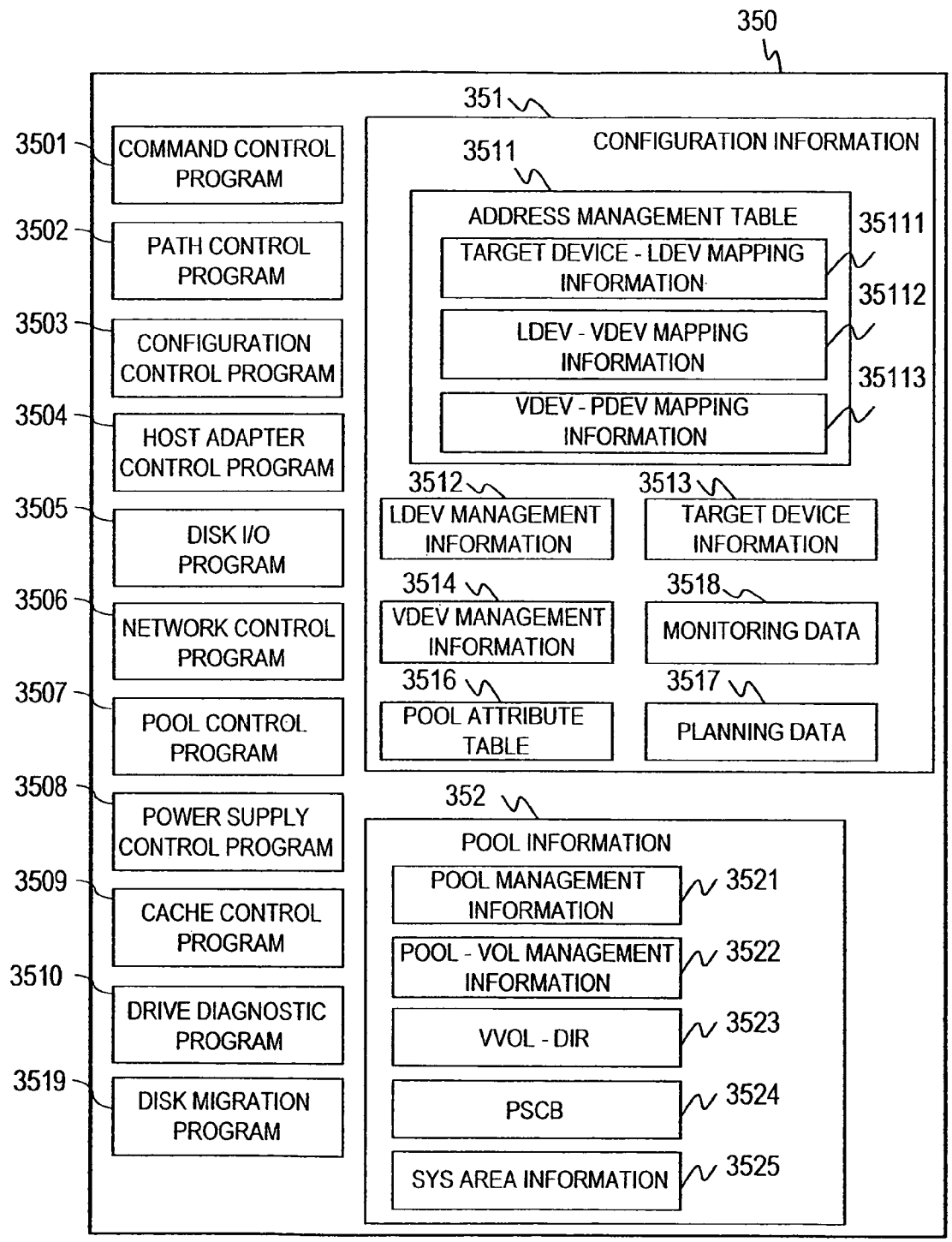
FIG. 3 is a block diagram of a memory according to the embodiment of this invention.

FIG. 3 is a block diagram of the memory 350 in the control unit 31 of the storage system 30.

The memory 350 stores various programs read and executed by the processor 360, configuration information 351 related to settings of LDEVs, and pool information 352 related to settings of a storage pool.

A command control program 3501 interprets a command from the host computer 10 or the storage system management apparatus 20, and executes processing prescribed in the command.

A path control program 3502 sets a path to the host computer 10.

A configuration control program 3503 controls the configuration of the storage system 30.

A host adapter control program 3504 controls data inputted and outputted by the host adapter 310.

A disk I/O program 3505 controls access to the PDEVs 34.

A network control program 3506 controls data sent and received via the storage network 50 or the management network 40.

A pool control program 3507 sets a storage pool.

A power supply control program 3508 controls turn on/off of electric power supplied by the power supply 36.

A cache control program 3509 controls the area and data of the storage cache memory 32.

A drive diagnostic program 3510 diagnoses the state of each disk device listed as the PDEVs 34.

A disk migration program 3519 executes processing related to a migration of the storage pool.

The configuration information 351 holds settings related to VDEVs and LDEVs of the storage system 30.

The pool information 352 holds settings related to a storage pool.

The configuration information 351 contains an address management table 3511, LDEV management information 3512, target device information 3513, VDEV management information 3514, a pool attribute table 3516 and planning data 3517.

The address management table 3511 holds mapping information in which addresses of target devices, LDEVs, VDEVs, and physical devices are mapped out. The address management table 3511 includes target device-LDEV mapping information 35111, LDEV-VDEV mapping information 35112 and VDEV-PDEV mapping information 35113.

The pool characteristic table 3516 represents characteristics of the storage pools.

The planning data 3517 holds planning data set in advance as conditions for a planning execution.

The LDEV management information 3512 holds information related to LDEVs.

The target device management information 3513 holds information of LDEVs in a volume to which a path to the host computer 10 is set.

The VDEV management information 3514 holds information related to virtual logical volumes.

The pool information 352 contains POOL management information 3521, POOL-VOL management information 3522, VVOL-DIR 3523, PSCB 3524, and system area information 3525.

The POOL management information 3521 holds settings of a storage pool. The POOL-VOL management information 3522 holds information on volumes of a storage pool. The VVOL-DIR 3523 holds allocation of addresses of LDEVs of a storage pool. The PSCB holds information on addresses of LDEVs of a storage pool. The system area information 3525 holds information of LDEVs where configuration information of the storage system 30 is stored.

Figure 4:
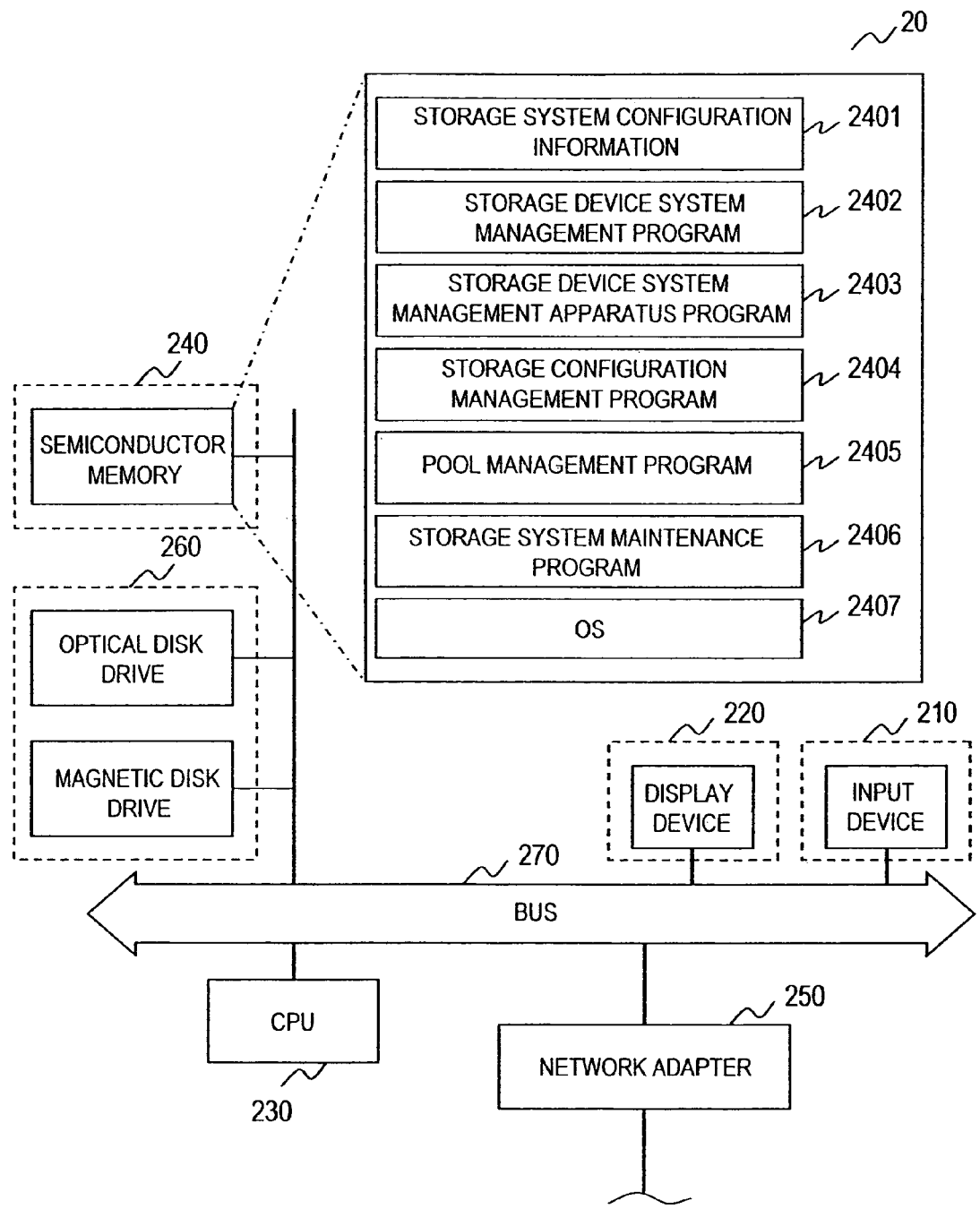
FIG. 4 is a configuration block diagram of a storage system management apparatus according to the embodiment of this invention.

FIG. 4 is a more detailed block diagram showing the configuration of the storage system management apparatus 20.

The storage system management apparatus 20 has, as described above, the input unit 210, the output unit 220, the CPU 230, the memory 240, the network adapter 250 and the disk drive 260.

The input unit 210 has an input device 211. The output unit 220 has an output device 221.

The memory 240 has a semiconductor memory 241. The disk drive 260 has an optical disk drive 242 and a magnetic disk drive 243.

The CPU 230 reads a program or configuration information from the optical disk drive 242 or from the magnetic disk drive 243, and loads the program or the configuration information into the semiconductor memory 241 to execute processing prescribed in the program.

The input unit 210, the output unit 220, the CPU 230, the memory 240, the network adapter 250 and the disk drive 260 are connected to one another by a bus 270.

Programs and data loaded into and run on the memory 240 include storage system configuration information 2401, a storage system management program 2402, a storage configuration management program 2403, a POOL management program 2404, a storage system maintenance program 2405 and an OS 2406.

The OS 2406 is the basic program of the storage system management apparatus 20. The rest of the programs are run on the OS 2406.

The storage system configuration information 2401 holds information on the configuration of the storage system 30.

The storage system management program 2402 manages the configuration of a storage constituted of logical volumes set in the storage system 30.

The storage system management server program 2403 receives a command to manage the configuration of a storing unit constituted of logical volumes set in the storage system 30.

The storage configuration management program 2404 manages the configuration of the storage system 30. Its configuration information is stored as the storage system configuration information 2401.

The POOL management program 2405 manages the configuration of a storage pool of the storage system 30.

The storage system maintenance program 2406 maintains the storage system 30.

With those programs, the storage system management apparatus 20 sets and changes the configuration of the storage system 30 and maintains the storage system 30.

The programs and information stored in the memory 240 may instead be stored in the memory 140 of the host computer 10. In other words, programs stored in the memory 140 of the host computer 10 may execute processing of setting or changing the configuration of the storage system 30.

In this case, the host computer 10 sends a command to a command device of the storage system 30. The command device is one of target devices of the storage system 30 that is chosen in advance. Receiving an I/O request directed to the command device from the host computer 10, the storage system 30 interprets the I/O request as an instruction command.

Figure 5:
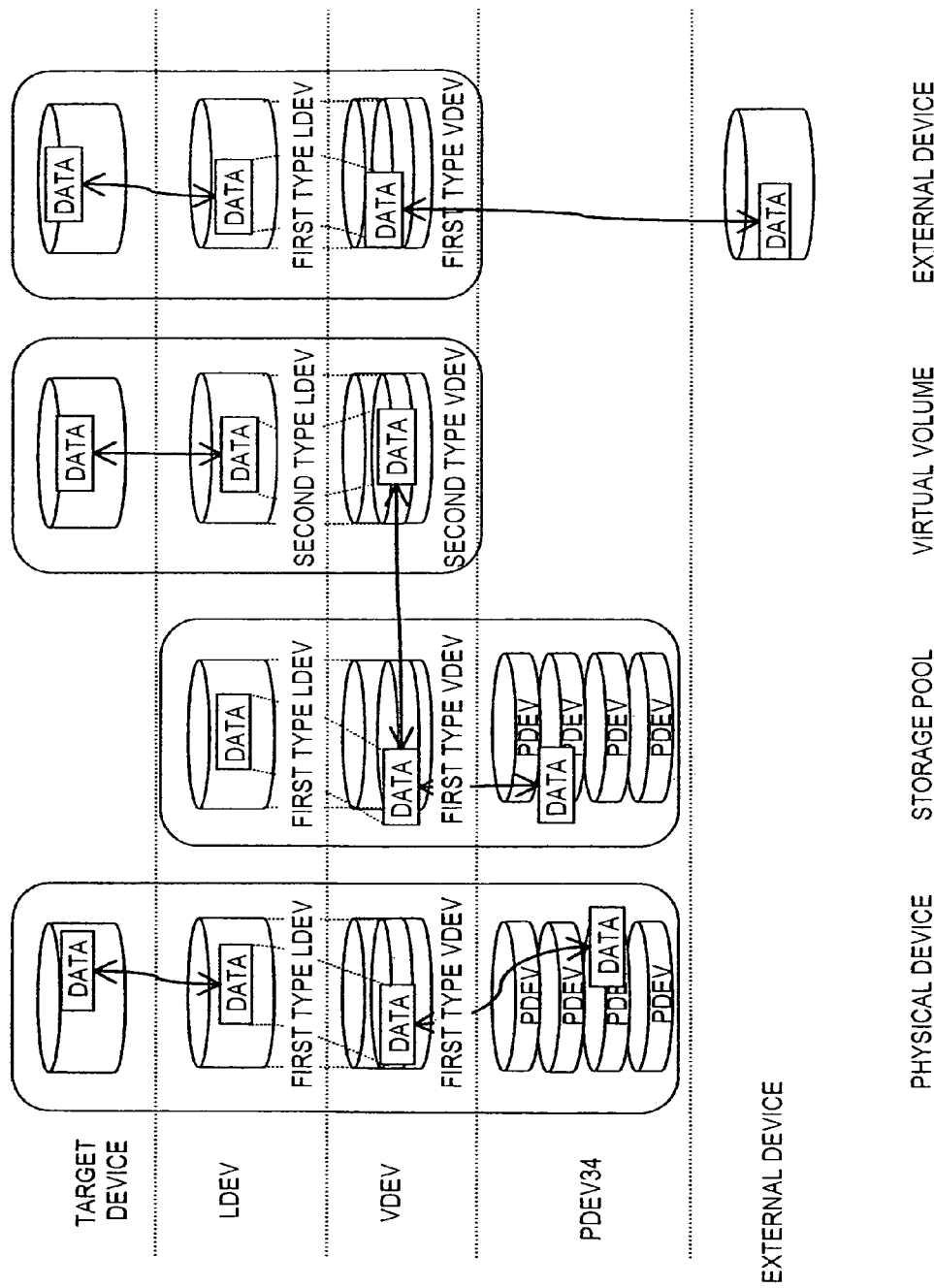
FIG. 5 is an explanatory diagram of a target device, an LDEV and a PDEV according to the embodiment of this invention.

FIG. 5 is an explanatory diagram of target devices, LDEVs, and PDEVs.

The host computer 10 accesses the target device 700 set in the storage system 30. The storage area of the target device 700 is the first-type LDEV 500 set as the target device 700.

The first-type LDEV 500 is an area of the first-type VDEV 400, which is constituted of physical volumes assuming a RAID configuration. The first-type VDEV 400 is divided into one or more first-type LDEVs 500.

The host computer 10 accesses, as the target device 701, a virtual volume set in the storage system 30. The storage area of the target device 701 is the second-type LDEV 501.

The second-type LDEV 501 is associated with the first-type LDEV 500 set as a storage pool.

The host computer 10 accesses the target device 701, which is a virtual volume. The storage area of the virtual volume is the second-type LDEV 501. When a request to access the second-type LDEV 501 is received, the storage system 30 consults the address management table 3511 and changes the device to be accessed to the first-type LDEV 500 that is associated with the second-type LDEV 501.

Figure 6:
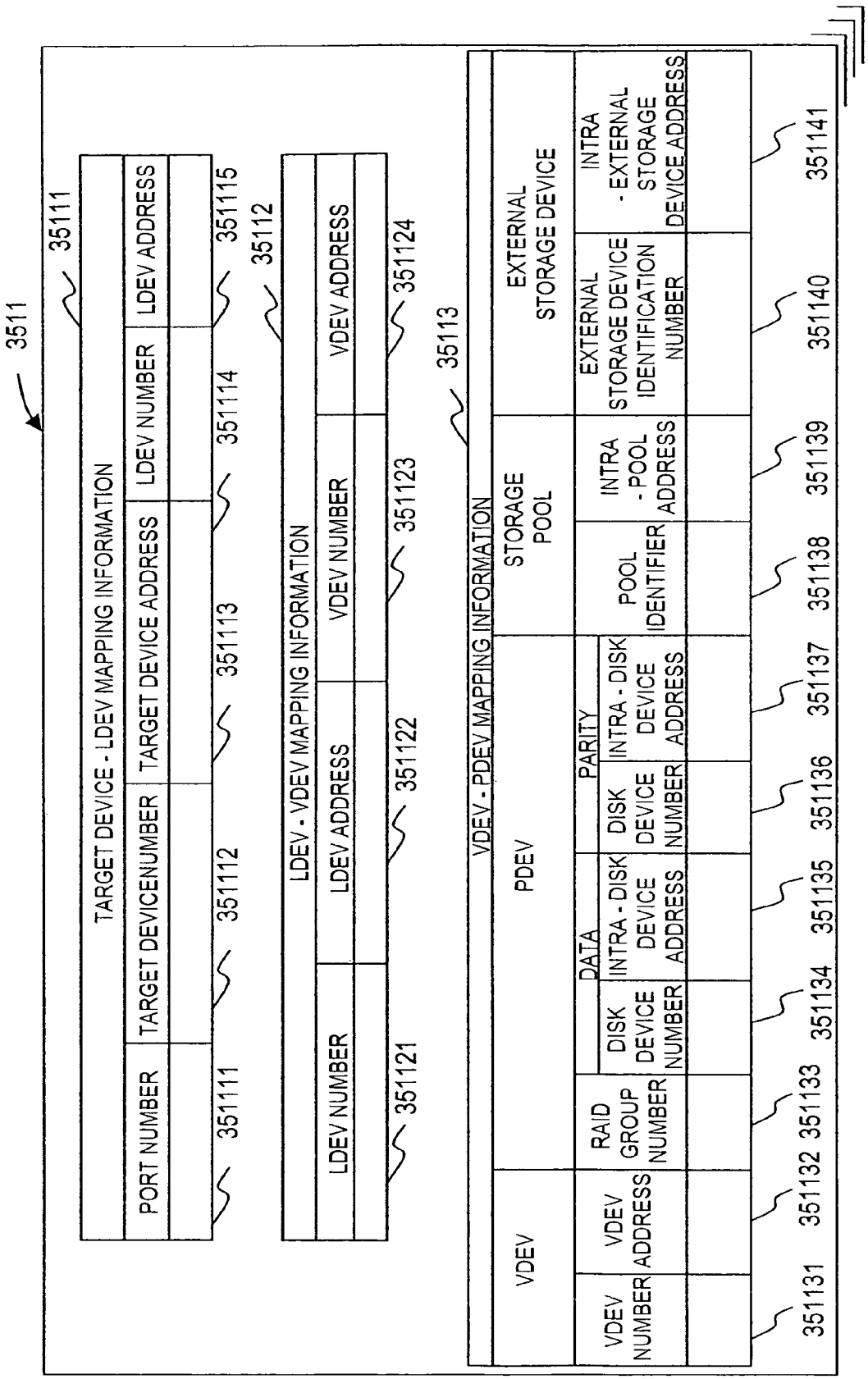
FIG. 6 is an explanatory diagram of an address management table according to the embodiment of this invention.

FIG. 6 is an explanatory diagram of the address management table.

The address management table 3511 holds mapping information in which addresses of target devices, LDEVs, VDEVs, and physical devices are mapped out.

The address management table 3511 includes the target device-LDEV mapping information 35111, the LDEV-VDEV mapping information 35112 and the VDEV-PDEV mapping information 35113.

The target device-LDEV mapping information 35111 holds the association between a target device address and an LDEV address.

More specifically, the target device-LDEV mapping information 35111 holds the association between the port number 351111, the target device device number 351112, and the target device address 351113, and the LDEV device number 351114 and the LDEV address 351115.

The LDEV-VDEV mapping information 35112 holds the association between an LDEV address and a VDEV address.

More specifically, the LDEV-VDEV mapping information 35112 holds the association between the LDEV number 351121 and the LDEV address 351122, and the VDEV device number 351123 and the VDEV address 351124.

The VDEV-PDEV mapping information 35113 holds the association between a VDEV address, and a number of a RAID group (or a parity group) of a VDEV and a PDEV address.

More specifically, the VDEV-PDEV mapping information 35113 holds the association between a VDEV device number 351131 and a VDEV address 351132, and a RAID group number 351133, a disk device number 351134 and an intra-disk device address 351135 of a data area constituting the RAID group, a disk device number 351136 and an intra-disk device address 351137 of a parity area constituting the RAID group, a pool identifier 351138 and an intra-POOL address 351139 when the VDEV is allocated a POOL, and a storage device identification number 351140 and an intra-storage device address 351141 when the VDEV is an external storage device.

The storage system 30 consults the address management table 3511 to know which address of which LDEV a target device address is associated with. Which address of which VDEV an LDEV address is associated with can also be known by consulting the address management table 3511. Furthermore, consultation with the address management table 3511 informs to which RAID group a VDEV address belongs as well as which address of which PDEV 34 the VDEV address is associated with.

Figure 7:
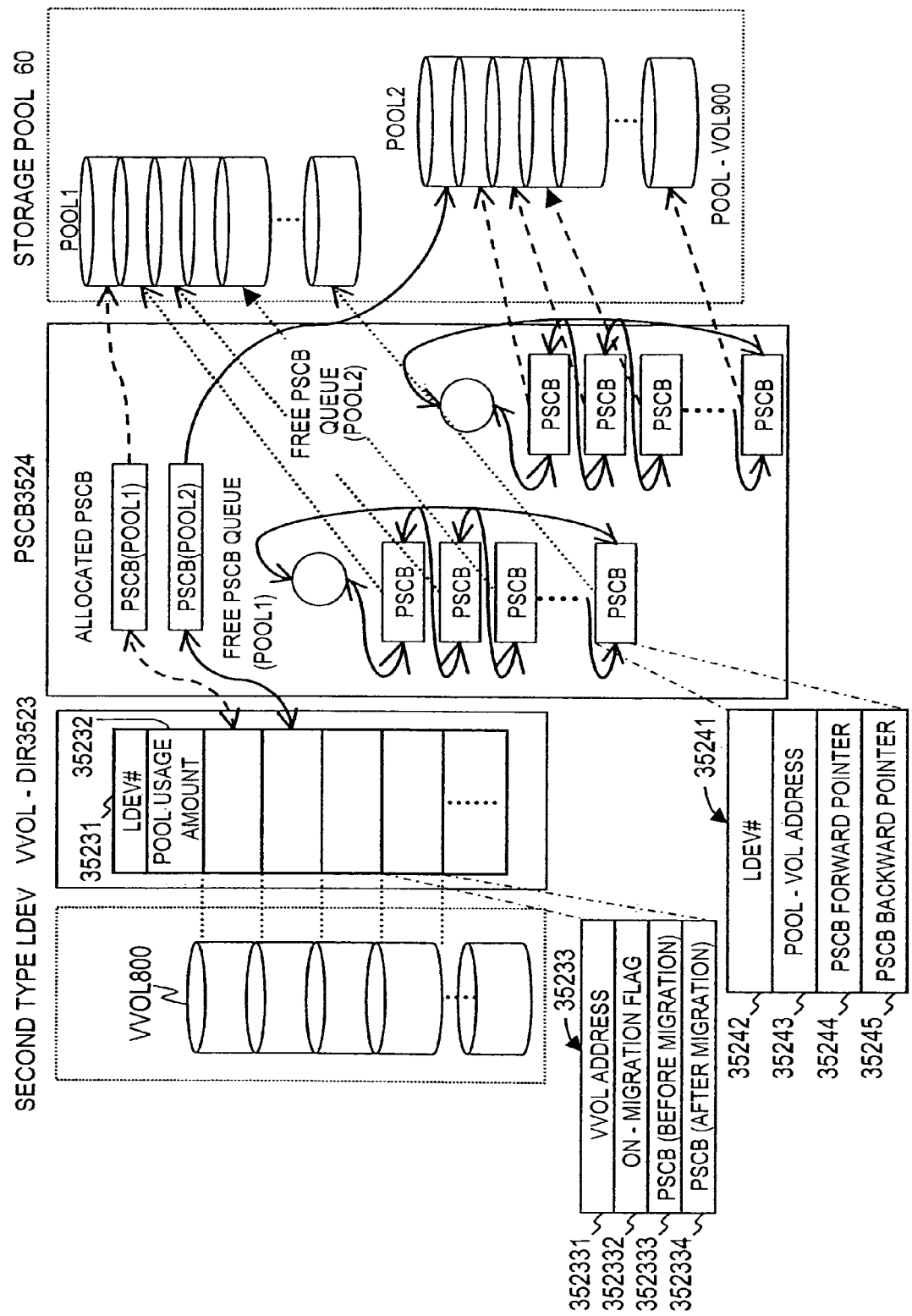
FIG. 7 is an explanatory diagram of VVOL-DIR and PSCB according to the embodiment of this invention.

FIG. 7 is an explanatory diagram of the VVOL-DIR 3523 and the PSCB 3524.

Stored as the VVOL-DIR 3523 is configuration information of a second-type LDEV, which is a storage area of a virtual volume. Stored as the PSCB (POOL Slot Control Block) 3524 is configuration information of a first-type LDEV set in a storage pool.

As described, the storage system 30 arranges the PDEVs 34 into a RAID configuration to build a first-type VDEV. The first-type VDEV is divided into first-type LDEVs, which are storage areas. A first-type LDEV is then set in a storage pool. A volume that is constituted of a first-type LDEV set in a storage pool is referred to as POOL-VOL and denoted by 900.

The storage system 30 also sets a virtual volume (VVOL). This virtual volume is divided into second-type LDEVs, which are storage areas.

The storage system 30 allocates a second-type LDEV of a VVOL 800 to a first-type LDEV of the POOL-VOL 900. In this way, a storage area of a virtual volume accessed by the host computer 10 is set in a first-type LDEV constituted of the PDEVs 34, which are physical devices.

The configuration of the virtual volume is stored as the VVOL-DIR 3523.

The VVOL-DIR 3523 comprises an LDEV number (LDEV #) 35231, a pool usage amount 35232 and an entry 35233.

Stored as the LDEV number (LDEV #) 35231 is the identifier of a second-type LDEV.

The pool usage amount is a usage amount of the pools allocated to the virtual volume, and holds the number of the PSCBs 3524.

The entry 35233 holds configuration information of a second-type LDEV. The entry 35233 includes a VVOL address 352331, an on-migration flag 352332, a PSCB pointer (before migration) 352333, and a PSCB pointer (after migration) 352334.

The VVOL address 352331 holds an address of a second-type LDEV in the VVOL.

The on-migration flag 352332 is set when an area of the VVOL is migrating in data migration processing described later.

In the case where the second-type LDEV 501 is allocated to a first-type LDEV 500 of the POOL-VOL 900, a pointer to the area of this first-type LDEV 500 is stored as and the PSCB pointer (before migration) 352333 and the PSCB pointer (after migration) 352334. Moreover, when the area of the VVOL is migrated by the data migration processing described later, the PSCB pointer before the migration and the PSCB pointer after the migration are respectively stored in the PSCB pointer (before migration) and the PSCB pointer (after migration).

By default, none of second-type LDEVs are set to first-type LDEVs, and accordingly "NULL" is stored as the PSCB pointer 352333 (before migration) and the PSCB pointer 352334 (after migration), respectively.

The PSCB (POOL Slot Control Block) 3524 indicates information of a first-type LDEV set in a storage pool. The PSCB 3524 is set for each slot of a first-type LDEV that is set in a storage pool.

The PSCB 3524 is constituted of an LDEV number (LDEV #) 35241, a POOL-VOL address 35242, a PSCB forward pointer 35243 and a PSCB backward pointer 35244.

Stored as the LDEV number (LDEV #) 35242 is the identifier of a first-type LDEV in the POOL-VOL. The POOL-VOL address 35242 indicates the address of the first-type LDEV in the POOL-VOL 900.

Stored as the PSCB forward pointers 35243 and the PSCB backward pointers 35244 are the identifiers of the front and back slots of the first-type LDEV in the POOL-VOL 900, respectively.

A free PSCB queue 35240 indicates the beginning of an unused area of the POOL-VOL 900. The free PSCB queue 35240 contains a pointer to the PSCB 3524 which indicates the next slot.

The storage system 30 consults a pointer contained in the free PSCB queue 35240 to obtain the next PSCB 3524. Then, the storage system 30 consults the PSCB backward pointer 35245 of the next PSCB 3524 to obtain the subsequent PSCB 3524. The PSCBs 3524 are thus traced down one at a time until the PSCB 3524 that corresponds to the final slot of the unused area is obtained. The PSCB backward pointer 35244 of the final PSCB 3524 is the free PSCB queue 35240. The storage system 30 finds out the location of an unused area of the POOL-VOL 900 in a storage pool from a group linked by pointers of the PSCBs 3524 which is obtained by following the free PSCB queue 35240.

The storage system 30 sets the PSCB 3524 for a first-type LDEV set in a storage pool. Specifically, the PSCB 3524 is set for each slot of a first-type LDEV set in a storage pool, and then the free PSCB queue 35240 is set. By default, every part of a storage pool is unused and a group linked by the free PSCB queue 35240 covers all areas of first-type LDEVs set in the storage pool.

The storage system 30 makes an area of a storage pool available by allocating as many PSCBs 3524 as the number of necessary slots to the VVOL-DIR 3523, which represents configuration information of a second-type LDEV. Specifically, the storage system 30 consults the free PSCB queue 35240 and then obtains the PSCBs 3524 for necessary areas to be allocated to a second-type LDEV 501. Each obtained PSCB 3524 is allocated to an entry 35233 of the VVOL-DIR 3523. In other words, in each entry 35233 of the VVOL-DIR 3523, a pointer indicating the corresponding PSCB 3524 is stored as the PSCB pointer 35234. Once allocated, the PSCB 3524 is removed from the link of the free PSCB queue 35240.

In this way, each slot of a second-type LDEV is allocated to the PSCB 3524 indicated by the PSCB pointer 35234 in each entry of the VVOL-DIR 3523. Since each PSCB 3524 corresponds to a slot of a first-type LDEV, this ultimately allocates the second-type LDEV 501 to the first-type LDEV and makes a virtual volume accessed by the host computer 10 usable as a physical device.

Figure 8:
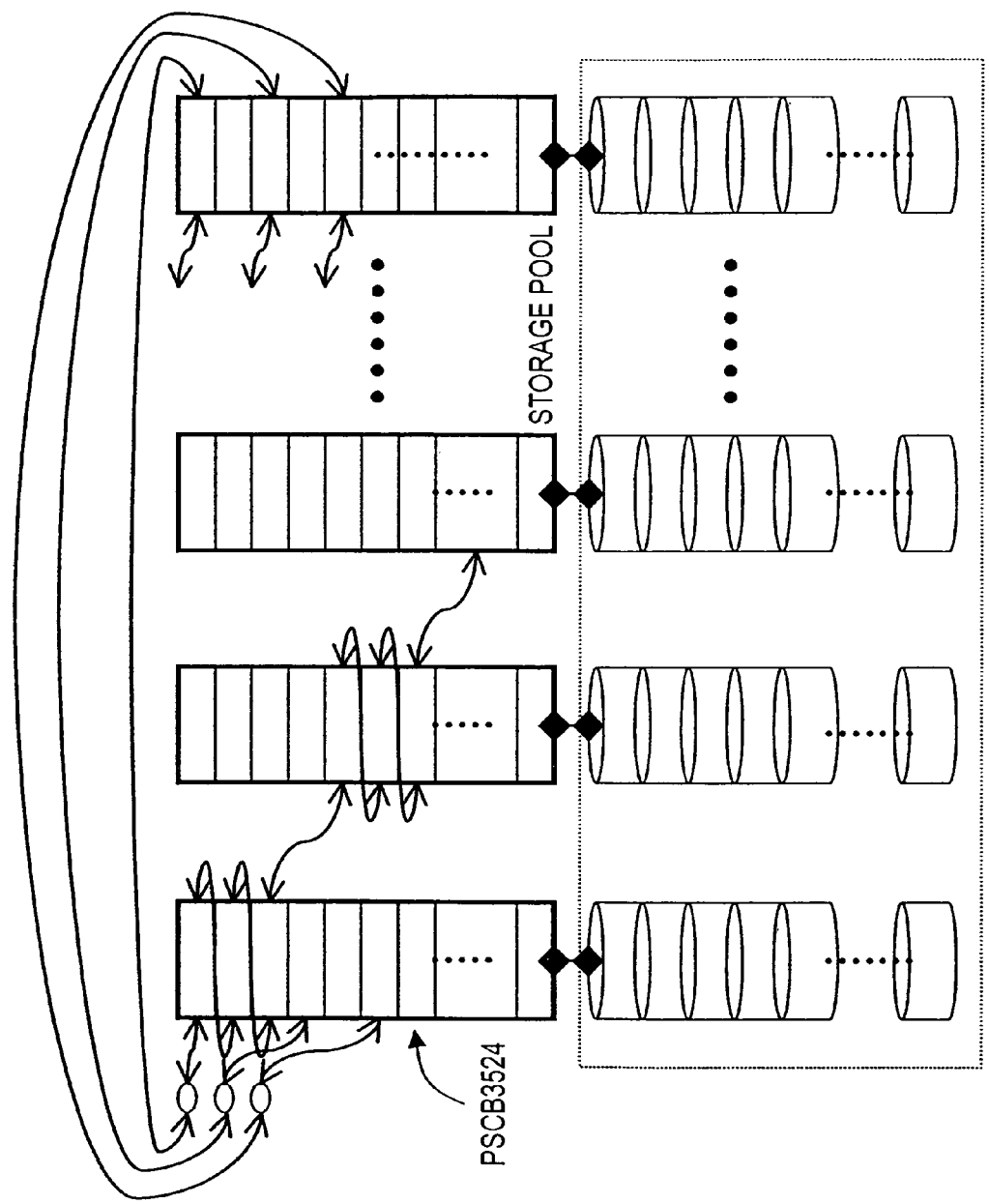
FIG. 8 is an explanatory diagram of an example of how PSCBs are linked according to the embodiment of this invention.

FIG. 8 is an explanatory diagram of an example of how the PSCBs 3524 are linked.

There are several ways to link the PSCBs 3524 of a first-type LDEV in the POOL-VOL 900.

In the example of FIG. 8, slots of first-type LDEVs in the same POOL-VOL are linked sequentially. This method is called sequential linking. Set in this way, a POOL-VOL obtains a continuous area stretching over first-type LDEVs. Accordingly, in the case where the host computer 10 stores large-sized data that spreads over plural LDEVs in the storage system 30, the data can be accessed by accessing only one POOL-VOL and it improves the access speed.

Figure 9:
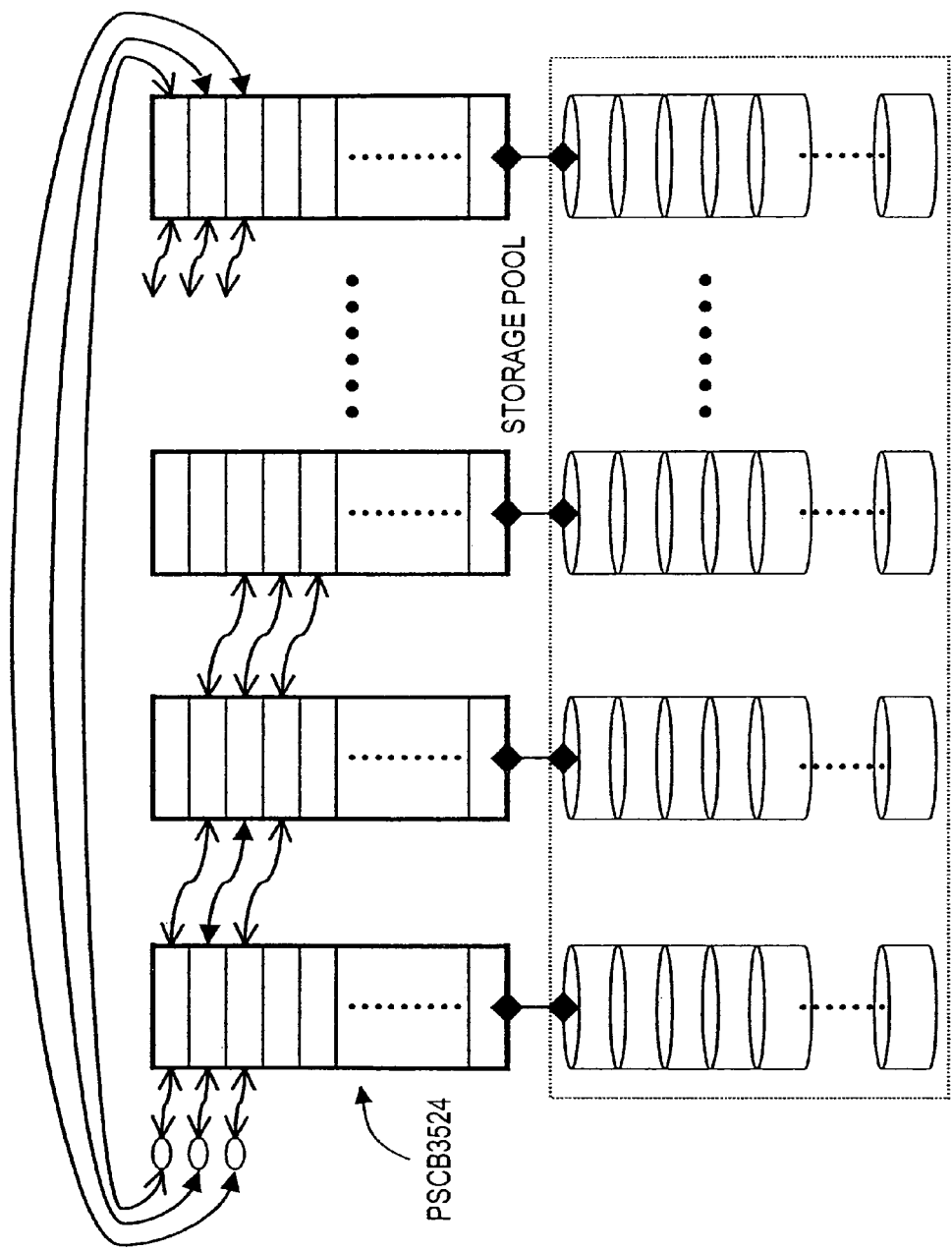
FIG. 9 is an explanatory diagram of another example of how PSCBs are linked according to the embodiment of this invention.

FIG. 9 is an explanatory diagram of another example of how the PSCBs 3524 are linked.

In the example of FIG. 9, slots of first-type LDEVs scattered over different POOL-VOLs 900 are linked. This method is called random linking. With random linking, in the case where the host computer 10 stores many, relatively small pieces of data each of which does not exceed the total capacity of an LDEV in the storage system 30, different first-type LDEVs are accessed in parallel and it improves the access speed.

Thus the storage system 30 can employ a method of linking PSCB 3524 that is suited to the type of data to be accessed.

A description will now be given of processing to associate a second-type LDEV to a storage pool by allocating the second-type LDEV to a first-type LDEV.

Figure 10:
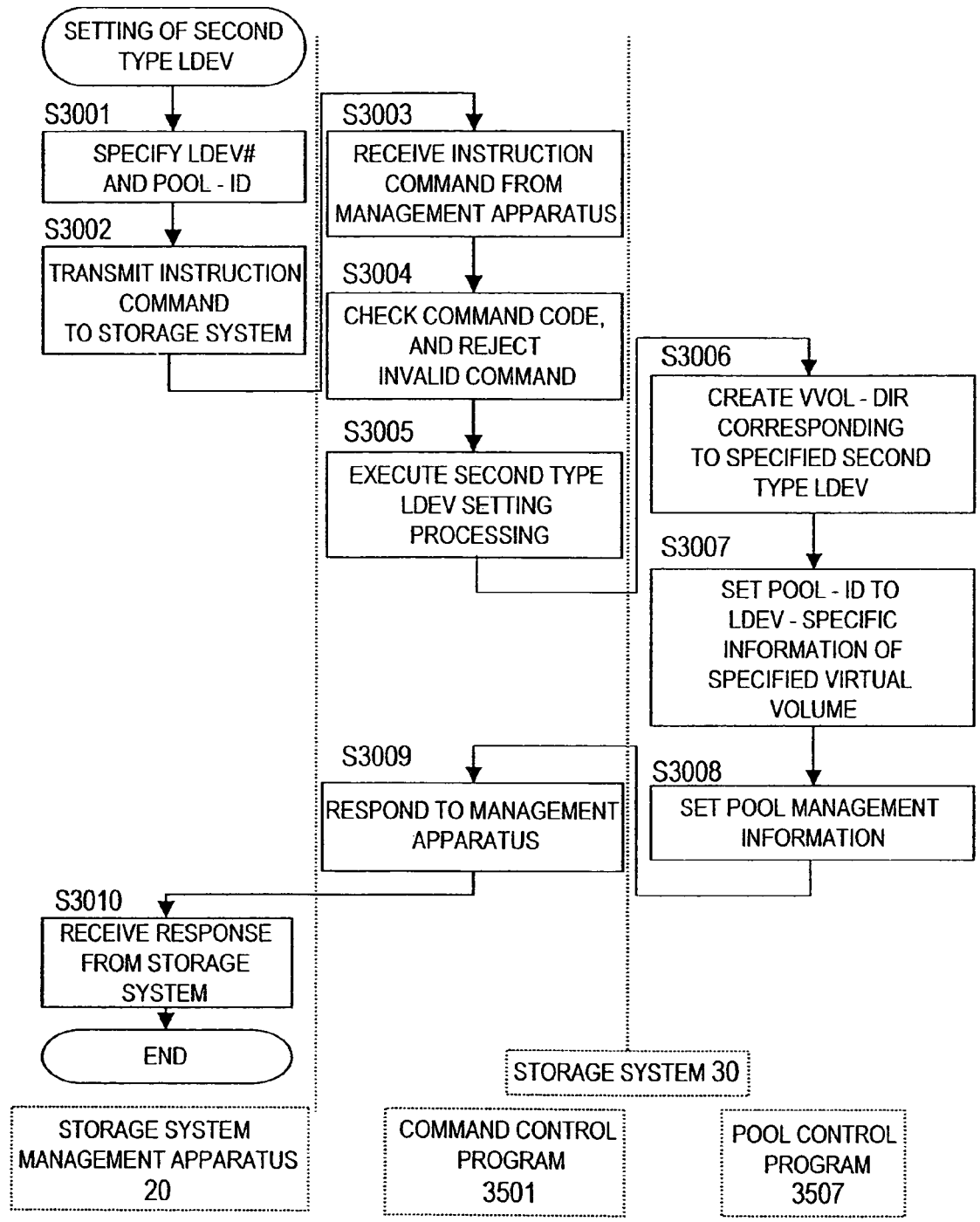
FIG. 10 is a flow chart for setting a second-type VDEV according to the embodiment of this invention.

FIG. 10 is a flow chart for setting a second-type LDEV.

This processing is executed by the storage configuration management program 2404 of the storage system management apparatus 20. A second-type LDEV associated with a storage pool through this processing is allocated to a first-type LDEV that is set in a storage pool to thereby enable the host computer 10 to use a virtual volume as a storage area.

First, the administrator operates the input unit 210 to set a POOL-ID, which is the identifier of a POOL-VOL of a storage pool, and an LDEV number of a second-type LDEV 501 that is to be associated with the storage pool (S3001).

The storage configuration management program 2404 creates an instruction command containing the information set by the administrator to associate a storage pool. The created instruction command is sent to the storage system 30 via the network adapter 250 (S3002).

In the storage system 30, the instruction command sent from the storage system management apparatus 20 is received by the command control program 3501 via the network adapter 320 (S3003). The command control program 3501 checks what is instructed by the received instruction command. In the case where the instruction is not valid, the instruction command is rejected (S3004).

When a received instruction command is about associating a storage pool, the command control program 3501 forwards the received instruction command to the pool control program 3507. The pool control program 3507 receives the instruction command and executes second-type LDEV setting processing (S3005).

The pool control program 3507 first creates the VVOL-DIR 3523 of the second-type LDEV that has the LDEV number designated in the instruction command (S3006). Specifically, the LDEV number is stored as the LDEV # 35231 of the VVOL-DIR 3523. Then, the entry 35233 of the VVOL-DIR 3523 is created for each slot of the second-type LDEV having the LDEV number.

Next, the pool control program 3507 consults the LDEV management information 3512 to obtain LDEV-specific information of the second-type LDEV whose LDEV number is designated in the instruction command. The POOL-ID designated in the instruction command is set as the POOL-ID of the obtained LDEV-specific information (S3007).

The pool control program 3507 next consults the POOL management information 3521 to obtain POOL-specific information for the POOL-ID designated in the instruction command (S3008). Specifically, information on second-type LDEVs contained in a virtual volume that is indicated by the instruction command is set as the POOL utilizing device count and POOL utilizing device number of the POOL-specific information.

After the storage pool is associated, the configuration control program 3503 notifies the storage system management apparatus 20 of the success of the command (S3009). Received response from the command by the storage system 30 (S3010), the storage configuration management program 2404 of the storage system management apparatus 20 ends the processing.

A second-type LDEV, which constitutes a virtual volume, is set in a storage pool through this processing.

FIG. 11 is an explanatory diagram of a pool characteristic table 3516 representing the characteristics of the storage pools.

The administrator of the storage system 30 sets the above-described linkage methods to volumes managed by the administrator, namely respective storage pools set to the first-type VDEVs constituted of respective devices such as PDEVs 34, EDEVs 600, tape libraries 800, and remote storage systems 900 in advance. The setting is then stored in the pool characteristic table 3516.

Moreover, connection interfaces and installation forms of volumes can be set as types of the storage pool in addition to the linkage forms such as the above-described sequential configuration and random configuration.

The connection interfaces include disk devices connected via the FC (Fibre Channel) connection and the disk devices connected via the ATA (AT Attachment) and the like. Moreover, the installation forms include the external physical devices (EDEVs), disk devices of remote storage devices, and tape libraries.

For the management of the storage system 30, there may arise a demand for changing a target device with which a storage pool with a certain characteristic is associated to another characteristic. For example, as described above, when small data have been stored in a target device with the random configuration, and the size of data to be stored increase, the access speed may decrease in the random configuration. In this case, it is possible to solve the decrease of the access speed by changing the storage pool set to the target device to a storage pool with the sequential configuration.

Figure 12:
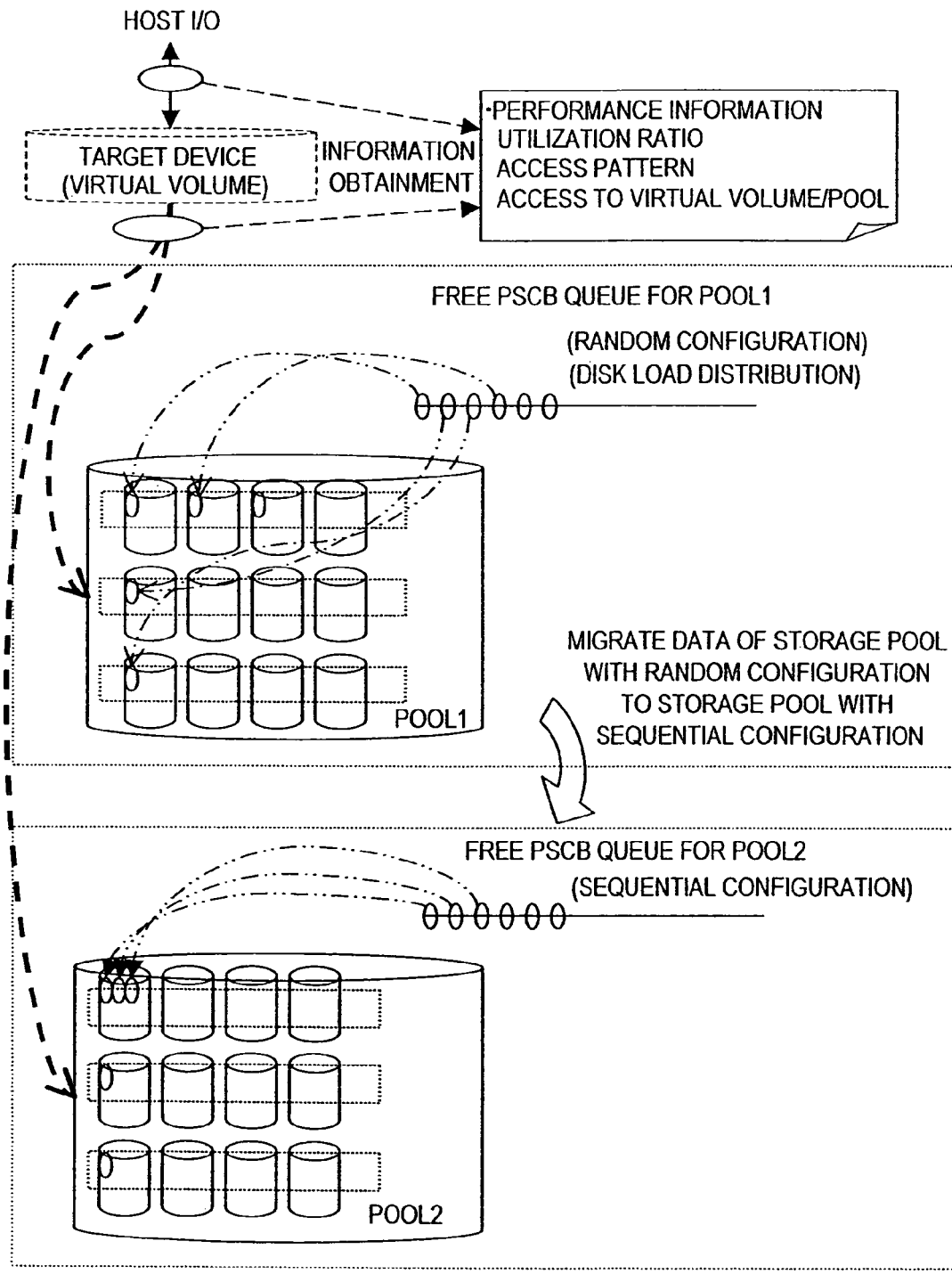
FIG. 12 is an explanatory diagram of a change of a storage pool set to a target device according to the embodiment of this invention.

FIG. 12 is an explanatory diagram of a change of a storage pool set to a target device.

An I/O request from the host computer 10 to the storage system 30 is executed for a target device 701 in the storage system 30. This target device 701 is associated with a certain storage pool 60.

On this occasion, the storage system 30 has obtained performance information on the I/O requests from the host computer 10. Specifically, the performance information includes a utilization ratio and an access pattern.

The storage system 30 consults the obtained performance information to determine whether or not a storage pool set to a target device 701 is changed to a storage pool with another linkage method. Then, data stored in the storage pool set to the target device are migrated to the other storage pool.

In the example shown in FIG. 12, the storage system 30 obtains the performance information of the I/O request from the host computer 10 to the target device associated with the a storage pool "POOL1" which has the random configuration, namely a disk load distribution configuration. As a result, the storage system 30 determines that the I/O to the target device often includes data with the sequential characteristic. Thus, the storage system 30 migrates the storage pool set to the target device from POOL 1 to "POOL2" which has the sequential characteristic. The migration of the storage pool 60 is carried out by changing the allocation of the PSCBs 3524. Moreover, on this occasion, the data stored in POOL1 is migrated to POOL2.

A description will now be given of migration processing of the storage pool.

Figure 13:
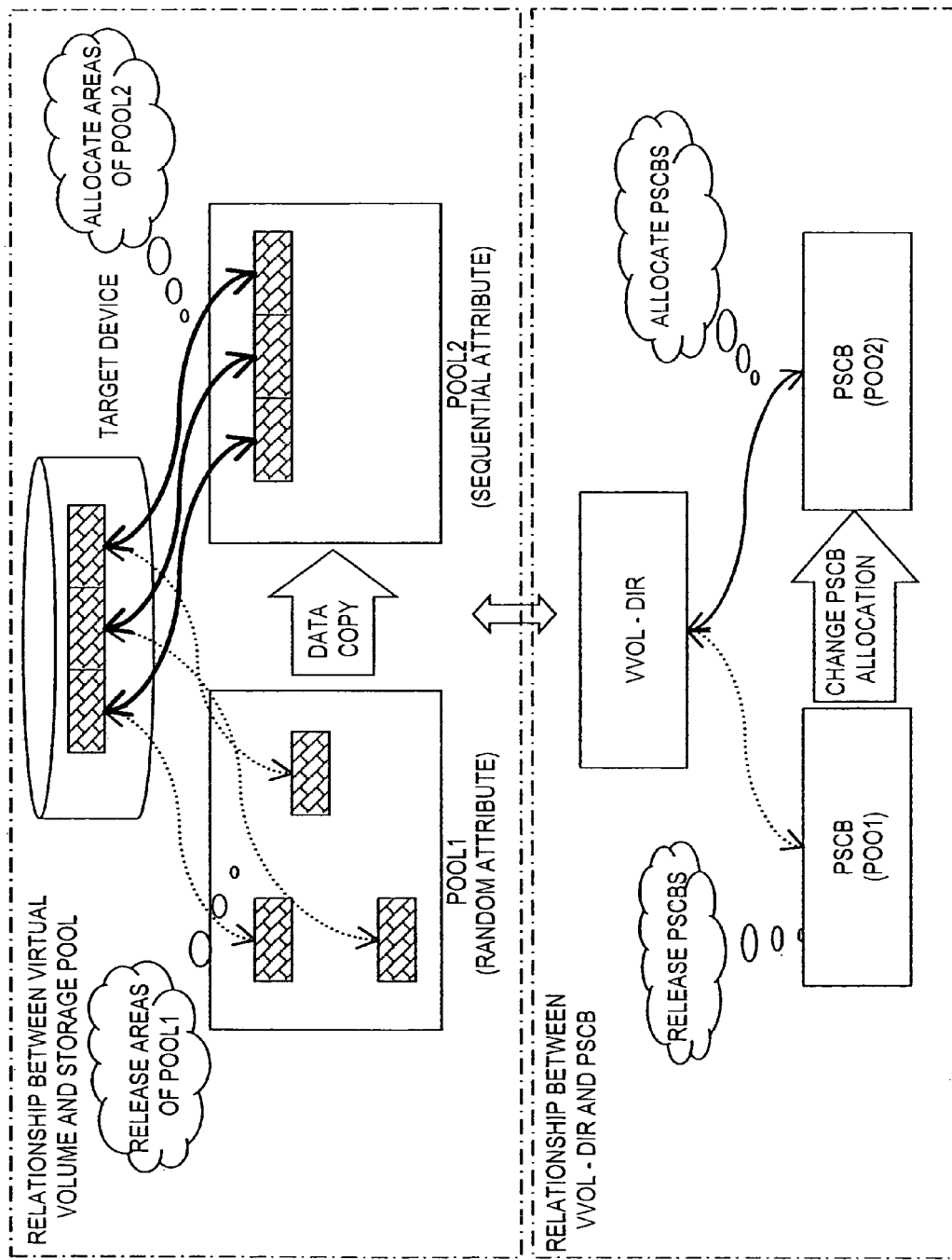
FIG. 13 is an explanatory diagram of a migration of the storage pool according to the embodiment of this invention.

FIG. 13 is an explanatory diagram of the migration of the storage pool.

As described above, the storage system 30 changes the association of the target device with POOL1 which is the storage pool with the random characteristic to the association with POOL2 which is the storage pool with the sequential characteristic.

Specifically, the disk migration program 3519 releases the allocation of the PSCBs 3524 for POOL1 to the VVOL-DIR 3523, and newly allocate the PSCBs 3524 for POOL2 to the VVOL-DIR 3523. At the same time, data stored in areas corresponding to the PSCBs 3524 whose allocation is to be changed are moved to areas corresponding to the newly allocated PSCBs 3524. As a result, the storage pool allocated to the target device is migrated in the storage system 30.

Figure 14:
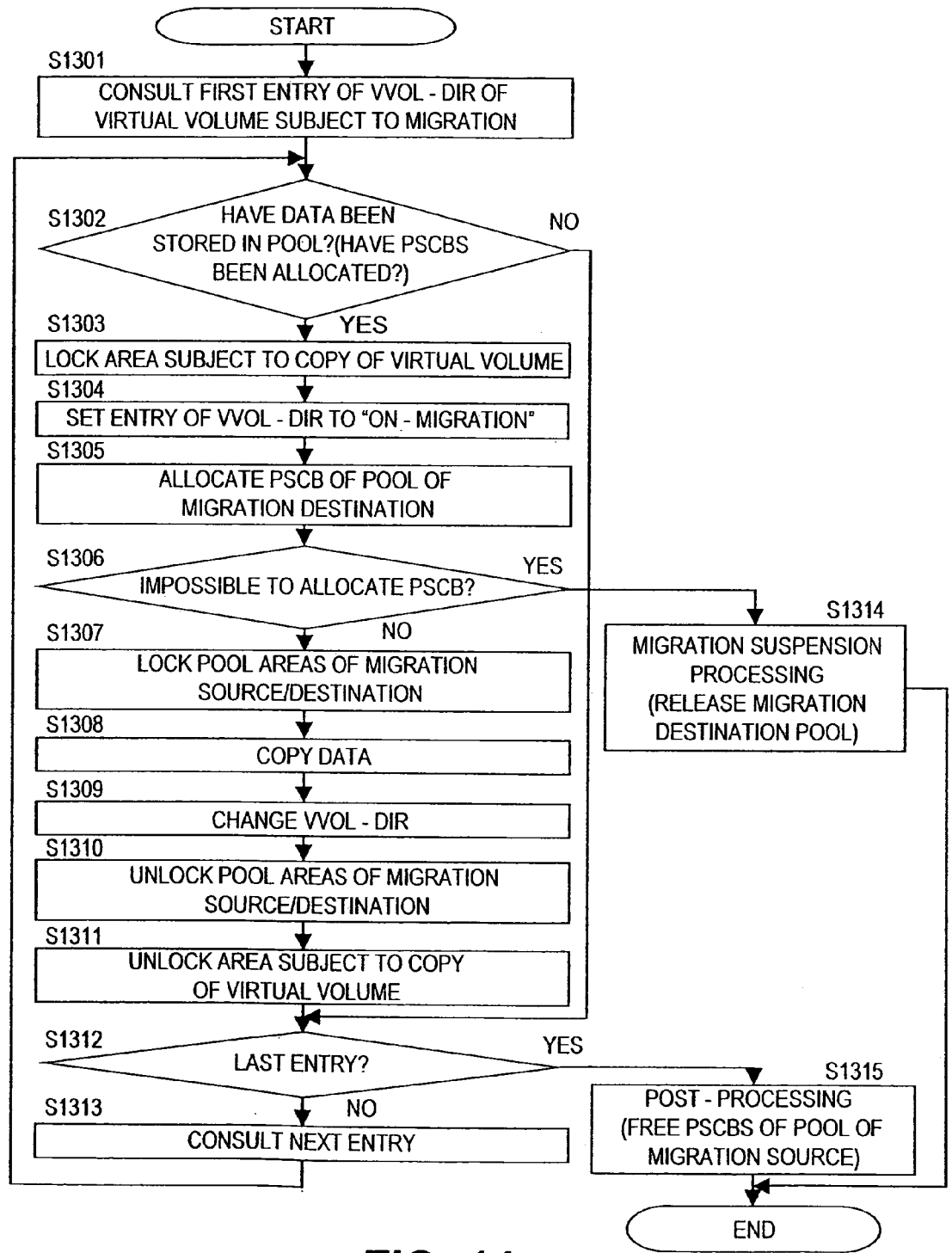
FIG. 14 is a flow chart of migration processing of the storage pool according to the embodiment of this invention.

FIG. 14 is a flow chart of the migration processing of the storage pool.

In the storage system 30, once the disk migration program 3519 determines to migrate the storage pool, the disk migration program 3519 executes this flow chart.

First, the disk migration program 3519 consults the VVOL-DIR 3523 of the target device subject to migration. Then, the disk migration program 3519 consults a first entry 35233 of the VVOL-DIR 3523 (S1301). Then, the disk migration program 3519 determines whether or not a PSCB 3524 have been allocated to this entry 35233, namely data have been stored in the storage pool 60 based on contents of the VVOL-DIR 3523 (S1302).

When a PSCB 3524 has been allocated, the disk migration program 3519 proceeds to a step S1303. When a PSCB 3524 has not been allocated, the disk migration program 3519 proceeds to a step S1312.

In the step S1303, the disk migration program 3519 first locks an area corresponding to the entry of the virtual volume which is the subject target device. As a result, the change of the data is prohibited in the area by an access from the host computer 10 or the like.

Then, the disk migration program 3519 sets the on-migration flag 352332 of the entry of the VVOL-DIR 3523 to "on-migration" (S1304).

Then, the disk migration program 3519 allocates a PSCB 3524 of the storage pool, which is to be the destination of the migration, to the VVOL-DIR 3523 (S1305). On this occasion, the disk migration program 3519 determines whether or not the storage pool, which is to be the migration destination, can be allocated to the PSCB 3524 (S1306).

When the disk migration program 3519 determines that the allocation to the PSCB 3524 is impossible, the disk migration program 3519 proceeds to a step S1314. In the step S1314, the disk migration program 3519 executes migration suspension processing for the storage pool. Namely, the disk migration program 3519 releases all the PSCBs 3524 presently being allocated from the VVOL-DIR 3523, and terminates the processing.

When the allocation of the PSCB 3524 is possible, namely, the allocation of the PSCB 3524 has been successful, the disk migration program 3519 locks an area of the storage pool 60 corresponding to the PSCB 3524 to be migrated. Moreover, the disk migration program 3519 locks an area of the storage pool corresponding to the PSCB 3524 of the migration destination (S1307).

Then, the disk migration program 3519 copies the data in the area of the storage pool corresponding to the PSCB 3524 subject to the migration to the area of the storage pool corresponding to the PSCB 3524 of the migration destination (S1308).

Then, the disk migration program 3519 changes this entry of the VVOL-DIR 3523 (S1309). Namely, the disk migration program 3519 sets a PSCB pointer to the migration subject to the PSCB pointer (before migration) 352333, and a PSCB pointer to the migration destination to the PSCB pointer (after migration) 352334.

Then, the disk migration program 3519 unlocks the area of the storage pool 60 corresponding to the PSCB 3524 subject to the migration. Moreover, the disk migration program 3519 unlocks the area of the storage pool corresponding to the PSCB 3524 of the migration destination (S1310).

Then, the disk migration program 3519 unlocks the area corresponding to the entry in the virtual volume which is the target device subject to the migration (S1311).

Then, the disk migration program 3519 determines whether or not the present entry is a last entry of the virtual volume (S1312). When the disk migration program 3519 determines that the present entry is not the last entry, the disk migration program 3519 consults a next entry, and executes the processing from the step S1302 to the step S1312.

When the disk migration program 3519 determines that the present entry is the last entry, the disk migration program 3519 proceeds to a step S1315, and executes post processing. Namely, the disk migration program 3519 releases the PSCBs 3524 of the storage pool of the migration subject, and returns them to a free PSCB queue, and ends the processing.

The processing described above migrates the storage pool of the target device.

A description will now be given of another example of the migration of the storage pool.

In above-described FIGS. 13 and 14, the storage system 30 changes the allocation of the storage pool set to the target device to the other storage pool. However, the storage pool may be migrated by changing the allocation to a preliminary device (referred to as reserve hereinafter) prepared in advance.

Figure 15:
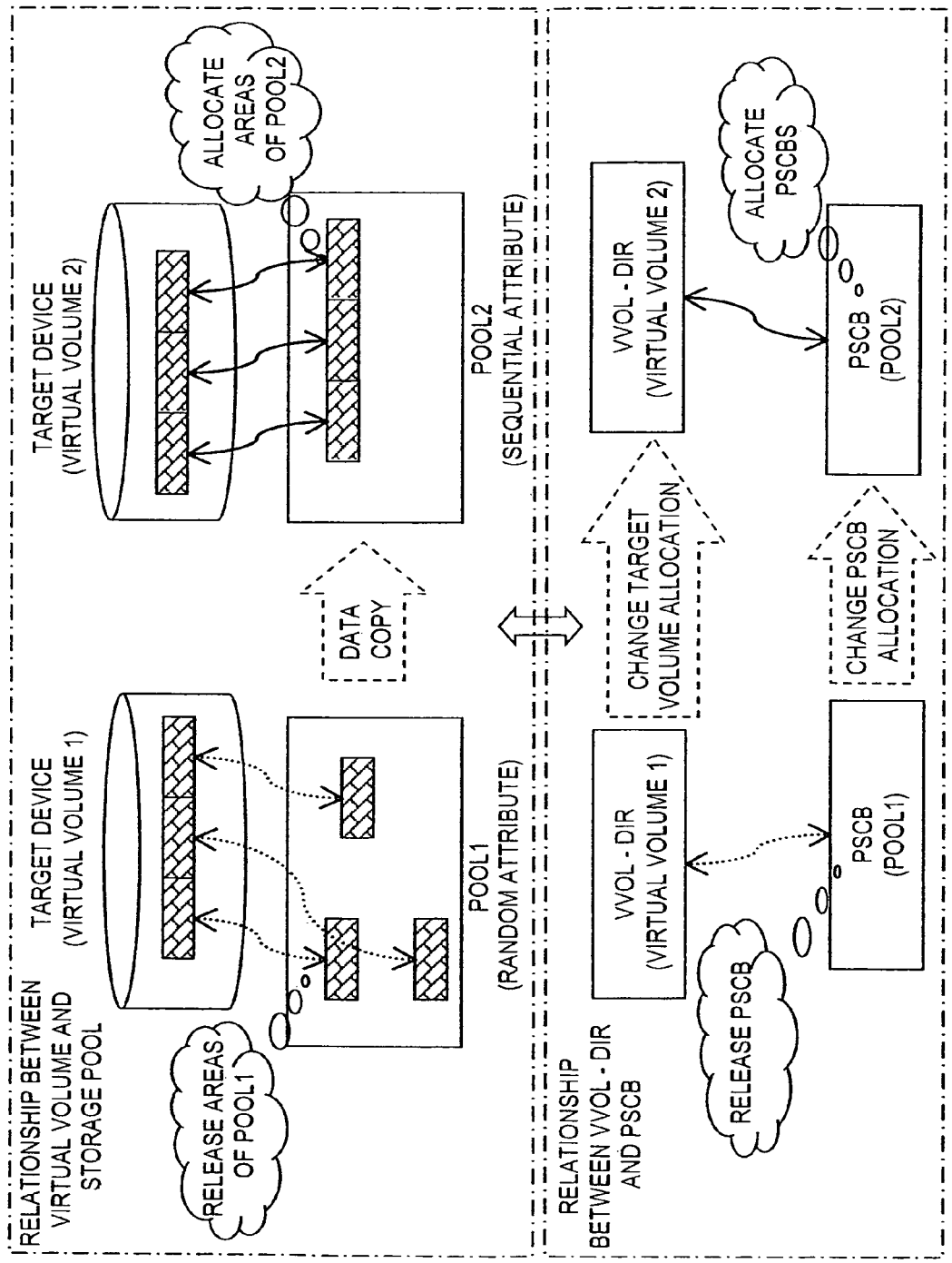
FIG. 15 is an explanatory diagram of another example of the migration of the storage pool according to the embodiment of this invention.

FIG. 15 is an explanatory diagram of another example of the migration of the storage pool.

In above-described FIG. 13, the storage system 30 migrates the storage pool by releasing the allocation of the PSCBs 3524 of POOL1 allocated to the VVOL-DIR 3523, and newly allocating the PSCBs 3524 of POOL2 to the VVOL-DIR 3523. However, in this example, the storage system 30 sets another virtual volume as a reserve in advance, which is different from the virtual volume serving as the target device accessed by the host computer 10.

Then, when the migration of the storage pool becomes necessary, the storage system 30 switches the storage pool associated with the target device of the migration source to the storage pool allocated to the virtual volume prepared the reserve as the migration destination. This switching is carried out by changing the allocation between the VVOL-DIR 3523 and the PSCBs. As a result, the storage pool 60 is migrated.

Figure 16:
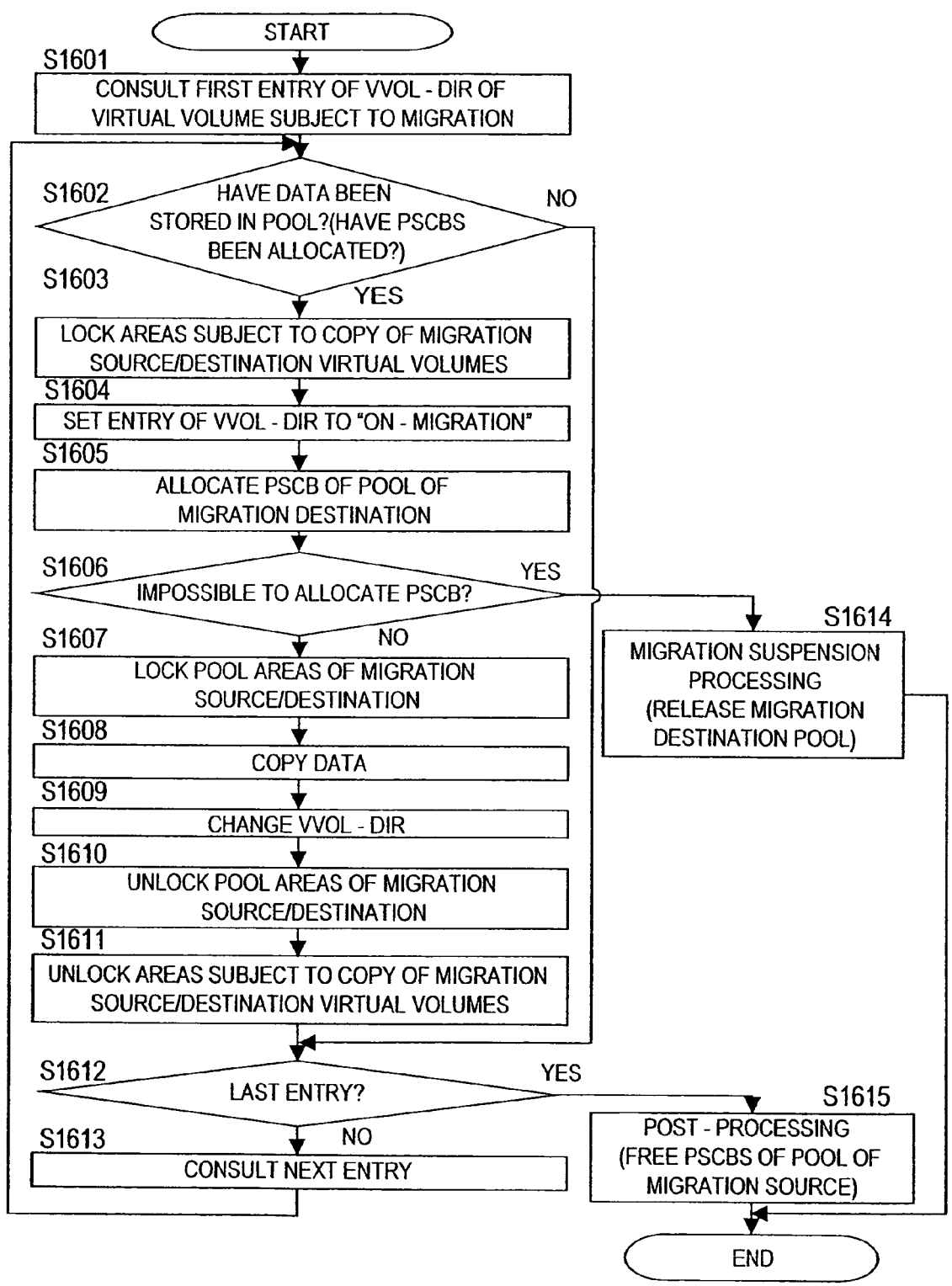
FIG. 16 is a flow chart of the migration of the storage pool of the example in FIG. 15 according to the embodiment of this invention.

FIG. 16 is a flow chart of the migration processing of the storage pool 60.

In the storage system 30, once the disk migration program 3519 determines to migrate the storage pool 60, the disk migration program 3519 executes this flow chart.

It should be noted that this processing is approximately the same as the processing described in FIG. 14. Namely, the disk migration program 3519 consults a first entry 35233 of the VVOL-DIR 3523 of the virtual volume subject to the migration (S1601). Then, the disk migration program 3519 determines whether or not the storage pool holds data (S1602).

When a PSCB 3524 has been allocated, the disk migration program 3519 proceeds to a step S1603. When a PSCB 3524 has not been allocated, the disk migration program proceeds to a step S1612.

In the step S1603, the disk migration program 3519 first locks an area corresponding to the entry of the virtual volume which is the subject target device. As a result, the change of the data is prohibited in the area by an access from the host computer 10 or the like.

Then, the disk migration program 3519 sets the on-migration flag 352332 of the entry of the VVOL-DIR 3523 to "on-migration" (S1604).

Then, the disk migration program 3519 allocates a PSCB 3524 of the storage pool, which is to be the destination of the migration, to the VVOL-DIR 3523 (S1605). On this occasion, the disk migration program determines whether or not the storage pool 60, which is to be the migration destination, can be allocated to the PSCB 3524 (S1606).

When the disk migration program determines that the allocation to the PSCB 3524 is impossible, in the step S1314, the disk migration program executes migration suspension processing for the storage pool.

When the allocation of the PSCB 3524 is possible, namely, the allocation of the PSCB 3524 has been successful, the disk migration program 3519 locks an area of the storage pool corresponding to the PSCB 3524 to be migrated. Moreover, the disk migration program locks an area of the storage pool corresponding to the PSCB 3524 of the migration destination (S1607)

Then, the disk migration program 3519 copies the data in the area of the storage pool corresponding to the PSCB 3524 subject to the migration to the area of the storage pool corresponding to the PSCB 3524 of the migration destination (S1608).

Then, the disk migration program 3519 changes this entry of the VVOL-DIR 3523 (S1609). Namely, the disk migration program sets a PSCB pointer to the migration subject to the PSCB pointer (before migration) 352333, and a PSCB pointer to the migration destination to the PSCB pointer (after migration) 352334.

Then, the disk migration program 3519 unlocks the area of the storage pool corresponding to the PSCB 3524 subject to the migration. Moreover, the disk migration program unlocks the area of the storage pool corresponding to the PSCB 3524 of the migration destination (S1610).

Then, the disk migration program 3519 unlocks the area corresponding to the entry in the virtual volume which is the target device subject to the migration (S1611).

Then, the disk migration program 3519 determines whether or not the present entry is a last entry of the virtual volume (S1612). When the disk migration program determines that the present entry is not the last entry, the disk migration program consults a next entry, and executes the processing from the step S1602 to the step S1612.

When the disk migration program determines that the present entry is the last entry, the disk migration program proceeds to a step S1315, and executes post processing. Namely, the disk migration program 3519 releases the PSCBs 3524 of the storage pool of the migration subject, and returns them to a free PSCB queue, and ends the processing.

The processing described above migrates the storage pool of the target device 701.

A description will now be given of another example of the migration of the storage pool.

In the above-described example in FIG. 13 or 15, the storage system 30 migrates the storage pool by migrating the storage pool associated with the target device. In addition to the above-described migration, there is another demand for changing logical devices corresponding to a target device from virtual devices (second-type VDEVs) used as a storage pool to real areas, namely devices constituted of PDEVs 34 (first-type VDEVs). For example, this demand arises in the storage system 30 when the access frequency to data decreases, and it is necessary to move the data to a tape device or an archive volume, or when it is necessary to directly store the data in first-type LDEVs for other applications.

In this case, the storage system 30 changes the target device accessed by the host computer 10 from a virtual volume to which a storage pool is allocated to a virtual volume constituted of first-type LDEVs. This change is carried out by changing information on the target device in the address management table 3511.

As described above, by causing the storage system 30 to change the allocations of the VVOL-DIR 3523, the PSCBs, and the address management table 3511, the contents of the storage pool 60 which is the contents of the target device can be properly changed without changing the target device set for the host computer 10.

Figure 18:
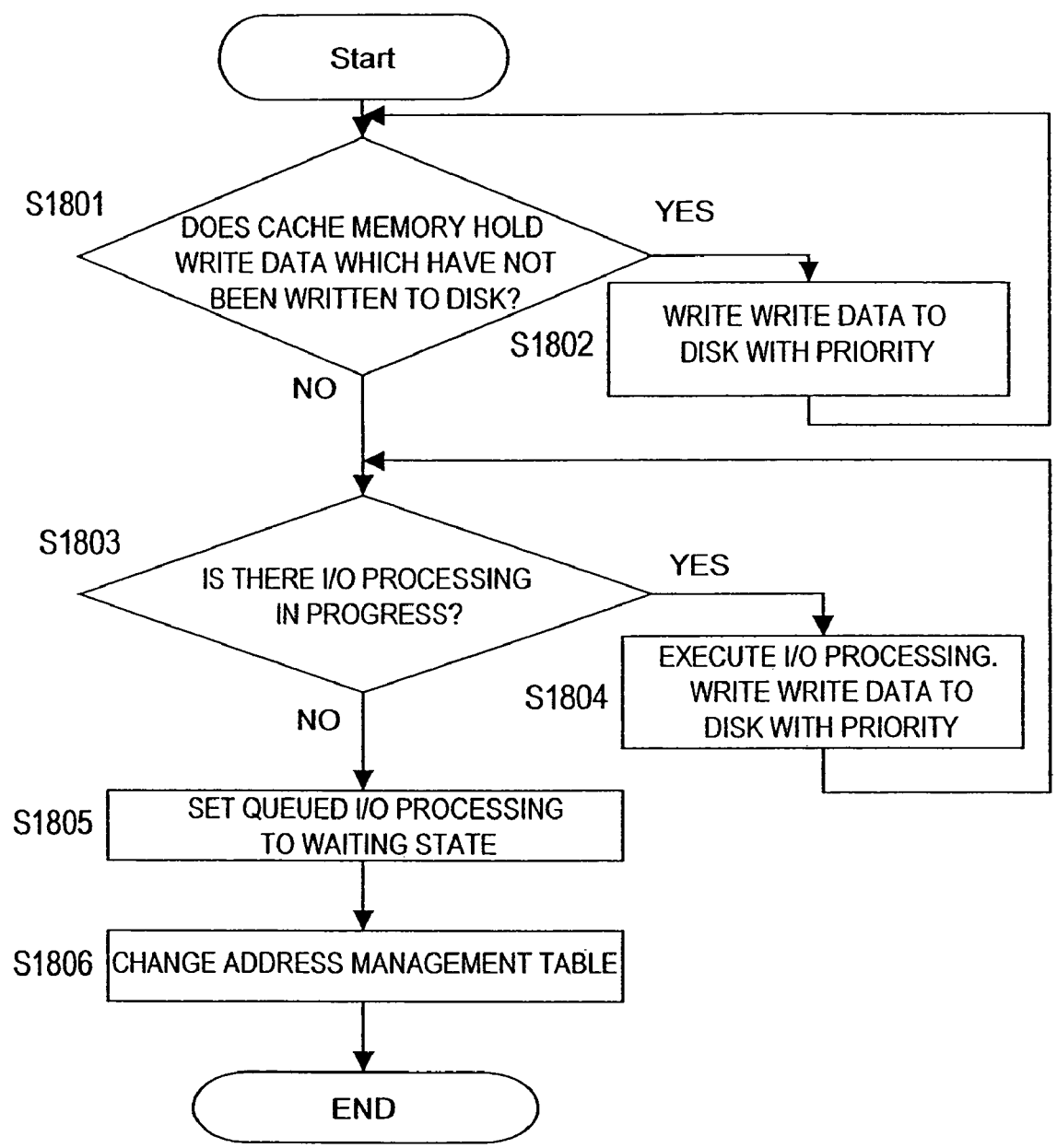
FIG. 18 is a flow chart of processing on a host I/O request during the migration processing of the storage pool according to the embodiment of this invention.

FIG. 18 is a flow chart of processing on a host I/O request being issued during the migration processing of the storage pool.

Generally, even in a state where the storage system 30 has received an I/O request from the host computer, the migration of the storage pool shown in FIG. 13 or 16 is carried out. On this occasion, in the storage system 30, among I/O requests from the host computer 10, a write request to a locked area is queued without being processed, and is waiting for the processing. In order to address this unprocessed write request, the processing of this flow chart is executed.

First, the disk migration program 3519 determines whether or not in a cache memory area of the memory 350 holds write data which has not been written to a disk (S1801).

When the disk migration program 3519 determines that there is write data which has not been written to the disk, the disk migration program 3519 writes the data to a destination area of the writing with priority over the other processing in the storage system 30 (S1802), returns to the processing in the S1801, and determines whether or not there are other write data. When the disk migration program determines that there is no write data which has not been written to the disk, the disk migration program proceeds to a step S1803.

In the step S1803, the disk migration program 3519 determines whether or not there is an I/O request which is in progress. It should be noted that the I/O request in progress implies an I/O request (reading/writing of data) which has not been completed yet on the start of the processing of this flow chart. When the disk migration program determines that there is an I/O request in progress, the disk migration program 3519 processes the I/O request (S1804). Especially, when the I/O request is a write request, the disk migration program 3519 processes the write request with a priority over the other processing in the storage system 30. After this processing, the disk migration program returns to the processing in the step S1803, and determines whether or not there are other I/O requests. When the disk migration program determines that there is no I/O request in progress, the disk migration program proceeds to a step S1805.

In the step S1805, the disk migration program 3519 changes the state of processing for queued I/O requests to a waiting state.

Then, there is changed the association between the LDEVs and VDEVs in the address management table.

Figure 19:
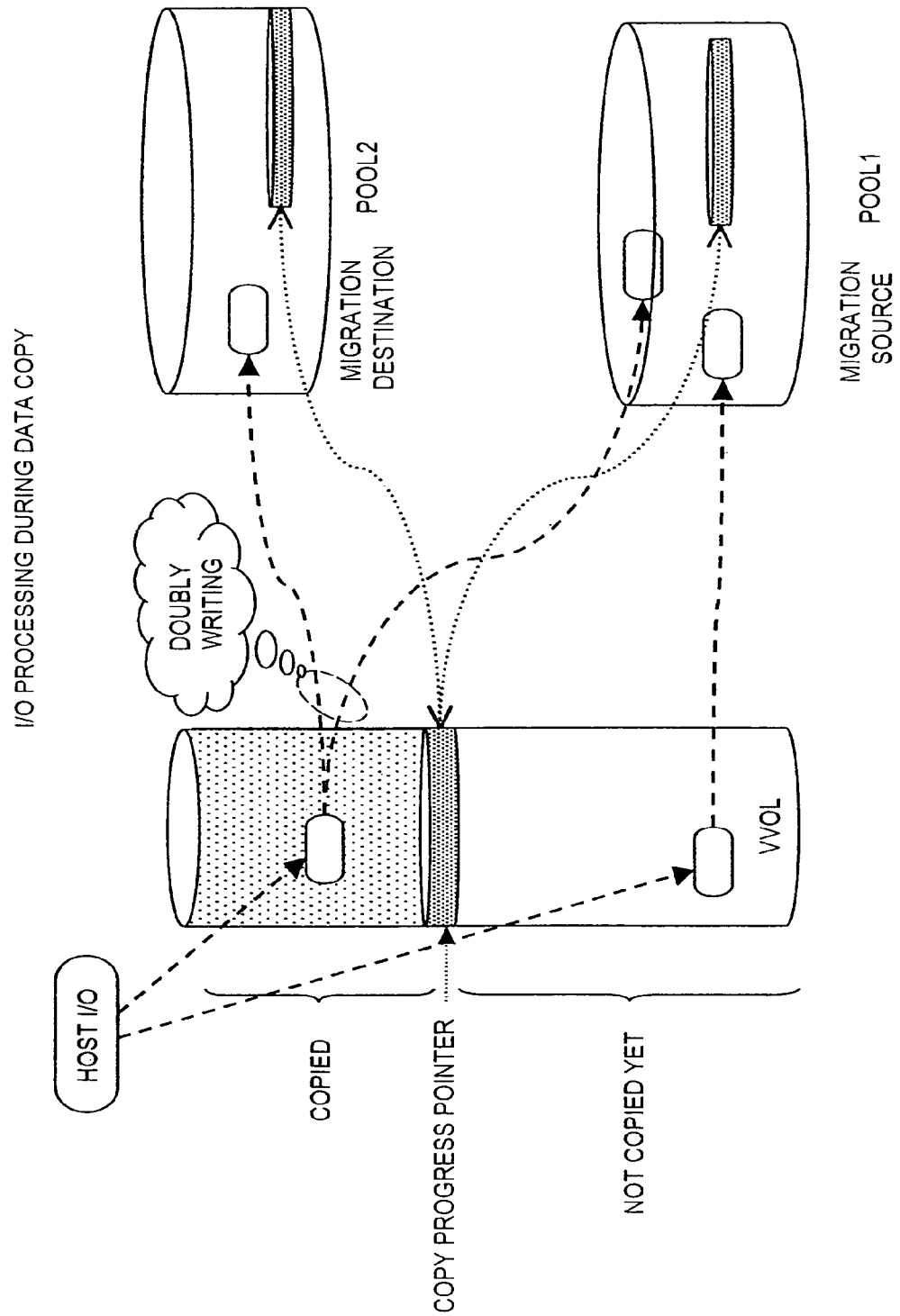
FIG. 19 is an explanatory diagram of a write request from a host computer during the migration processing of the storage pool according to the embodiment of this invention.

FIG. 19 is an explanatory diagram of an I/O request for a data write (write request) from the host computer 10 during the migration processing of the storage pool 60.

When the host computer 10 issues an I/O request for writing data to a target device while the migration of a storage pool is being processed, the storage system 30 executes the following processing. When an area related to the write request from the host computer 10 is an area of the virtual volume to which the migration processing of a storage pool has already been completed, the storage system 30 processes the write request as writing simultaneously to an area of the migration source storage pool and to an area of a migration destination storage pool. On the other hand, when the area related to the write request from the host computer 10 is an area of the virtual volume to which the migration processing of a storage pool has not already been completed, the storage system 30 processes the write request as writing only to the area of the migration source storage pool.

It should be noted that the storage system determines whether or not an area of the virtual volume has already been migrated based on a copy progress pointer corresponding to an address in the virtual volume. The copy progress pointer holds a value corresponding to an address of an area to be locked in the processing in the step S1303 in the storage pool migration processing shown in FIG. 14.

Figure 20:
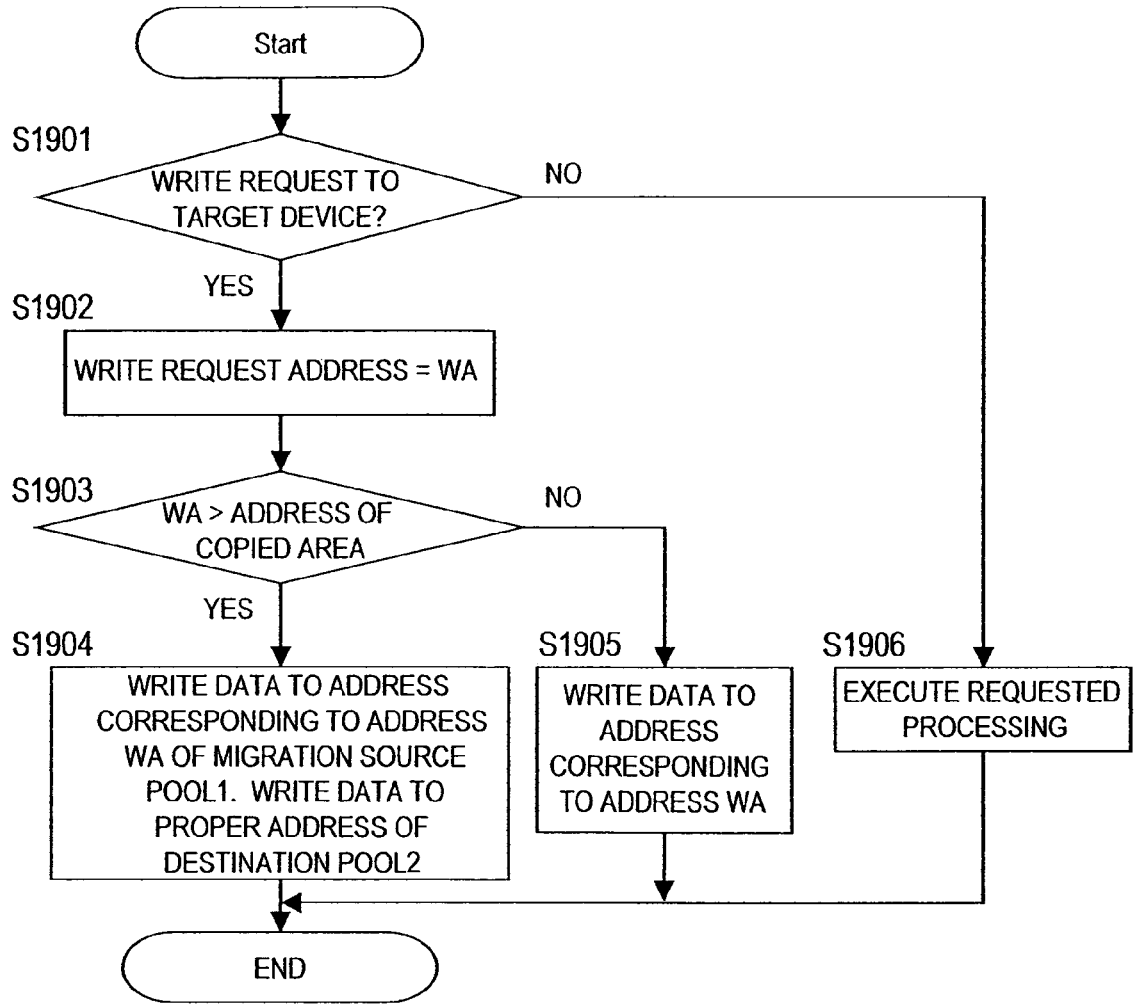
FIG. 20 is a flow chart on the write request from the host computer during the migration processing of the storage pool according to the embodiment of this invention.

FIG. 20 is a flow chart of an I/O request for writing data (write request) from the host computer 10 during the migration processing of a storage pool.

In the storage system 30, the disk I/O program 3505 determines whether or not there is a write request to the virtual volume of the target device related to the storage pool migration processing in above-described FIG. 14 (S1901). When the I/O request is a write request to the virtual volume related to the storage pool migration processing, the disk I/O program proceeds to a step S1902. When the I/O request is not a write request to the virtual volume related to the storage pool migration processing, namely the I/O request is a write request to other target device or other request, the disk I/O program executes processing based on the request (S1906), and ends the processing of this flow chart.

In the step S1902, the disk I/O program 3505 stores an address of an area subject to writing related to the write request in a write processing address WA.

Then, the disk I/O program 3505 determines whether or not the write processing address WA is before an area to which the storage pool migration processing has been completed (S1903).

When the address stored in the write processing address WA is before an address of the area to which the storage pool migration processing has been finished, the storage pool migration processing has been finished for an area corresponding to the write processing address WA. Thus, the disk I/O program proceeds to a step S1904, and writes write data in the area corresponding to the write processing address WA in the storage pool which is the source of the migration. At the same time, the disk I/O program writes the write data in a proper area of a storage pool which is the destination of the migration.

On the other hand, when the address stored in the write processing address WA is before an address of the area to which the storage pool migration processing has been finished, the storage pool migration processing has been finished for an area corresponding to the write processing address WA. Thus, the disk I/O program 3505 proceeds to a step S1905, and writes write data in the area corresponding to the write processing address WA in the storage pool 60 which is the source of the migration.

As described above, the write request during the storage pool migration processing is processed.

A description will now be given of storage pool 60 releasing.

Figure 21:
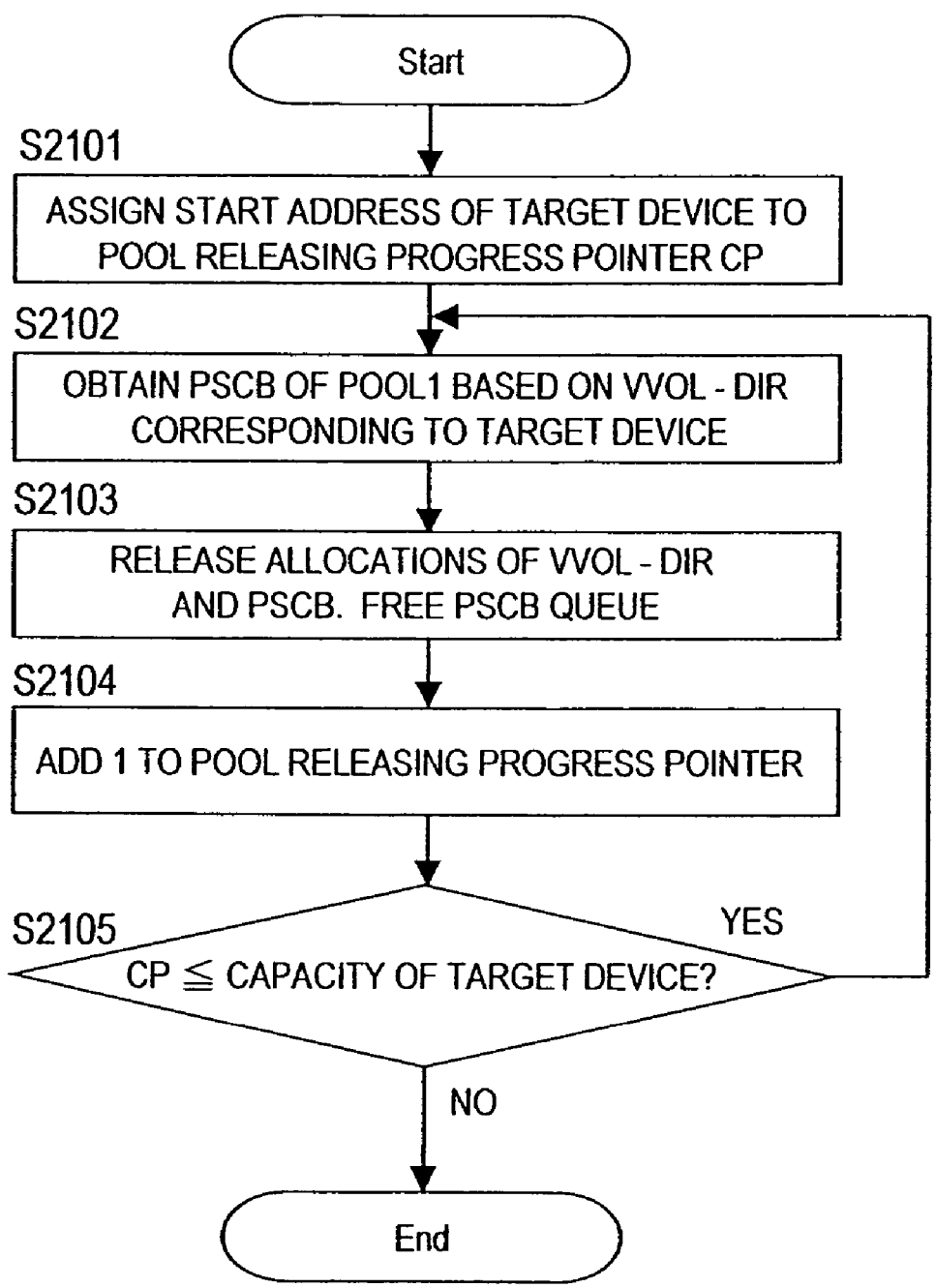
FIG. 21 is a flow chart of releasing of the storage pool according to the embodiment of this invention.

FIG. 21 is a flow chart of the releasing of the storage pool 60.

In the above-described step S1315 in FIG. 14, the PSCBs 3524 of the storage pool subject to the migration are released and are returned to the free PSCB queue. A description will now be given of specific processing on this occasion.

First, the disk migration program 3519 stores a start address of the storage pool subject to the migration in a pool releasing progress pointer CP (S2101).

Then, the disk migration program 3519 consults the VVOL-DIR 3523 of the storage pool to obtain a PSCB pointer (before migration) 352333 (S2102).

Then, the disk migration program 3519 releases the PSCB pointer (before migration) obtained from the VVOL-DIR 3523. Then, the disk migration program releases a PSCB pointed by the PSCB pointer (before migration) (S2103).

Then, the disk migration program 3519 adds one to the pool releasing progress pointer CP (S2104), and determines whether or not the value of the pool releasing progress pointer CP exceeds the capacity of the storage pool subject to the migration (S2105).

When the value of the pool releasing progress pointer CP is less than the capacity of the storage pool, the disk migration program returns to the step S2102, and repeats the processing. On the other hand, when the value of the pool releasing progress pointer CP exceeds the capacity of the storage pool, the disk migration program ends the processing.

The above-described processing releases the storage pool 60.

A description will now be given of monitoring and planning.

The storage system 30 according to this embodiment processes the above-described migration of a storage pool so that an optimum storage pool 60 is selected according to an access form to data in the storage pool. Specifically, the storage system 30 obtains the structure of data stored in a storage pool, I/O characteristics, and the like for each storage pool associated with a target device (referred to as monitoring hereinafter). As a result of the monitoring, the storage system 30 determines whether or not to migrate the storage pool presently allocated to the target device to a storage pool with other characteristics, and executes migration from the present storage pool to the determined storage pool (referred to as planning).

As obtaining the monitoring data, in a controller 31 of the storage system 30, I/O characteristics between a target device and first-type LDEVs constituting storage pools (front side I/O characteristics), and I/O characteristics between the first-type LDEVs constituting the storage pools and PDEVs (back side I/O characteristics) are obtained. Moreover, the storage system 30 obtains a sequential characteristic of data stored in the storage pools based on an access unit of the data and a storage area of the data. Further, the storage system 30 obtains a usage amount, a usage ratio, an operation ratio, and the like for each storage pool.

FIG. 22 is an explanatory diagram of an example of the monitoring data.

In the storage system 30, the disk I/O program 3505 obtains the I/O characteristics such as those for writing and reading of data for the target devices, storage pools allocated to the target device, first-type LDEVs constituting the storage pools, and PDEVs constituting the first-type LDEVs. The disk I/O program 3505 stores the obtained I/O characteristics in the configuration information 351 of the memory 350 of the controller 31 as the monitoring data.

FIG. 22A is monitoring data related to the write request for data to the first-type LDEV. This monitoring data holds respective maximum values (MAXs) and average values (AVEs) for an I/O per second (IOPS) on the front side, an mega byte per second (MBPS) on the front side, an occupied time by the write request, a time when an access to write data is sequential, an IOPS on the back side, and an MBPS on the back side.

FIG. 22B is monitoring data related to the read request for data from the first-type LDEV 500. As in the case of the write request, this monitoring data holds respective maximum values (MAXs) and average values (AVEs) for an IOPS on the front side, an MBPS on the front side, an occupied time by the read request, a time when an access to read data is sequential, an IOPS on the back side, and an MBPS on the back side.

FIG. 22C is monitoring data related to all the I/O requests for data to and from the first-type LDEV. This monitoring data holds a ratio between the read requests and the write requests to the first-type LDEV, an occupied time of the access on the back end side, a cache hit ratio of all the data in the first-type LDEV, a cache dirty ratio, which is a ratio of data which have not been written yet to all cashed data of the first-type LDEV, a sequential data access ratio of all accesses to the data in the first-type LDEV, a utilization amount of a storage pool set to the first-type LDEV of all the data in the first-type LDEV, and an access ratio of the storage pool set to the first-type LDEV of all the data in the first-type LDEV.

FIG. 22D is monitoring data related to I/O requests per storage pool. This monitoring data holds a total capacity of the storage pool, a usage amount of the storage pool, a usage ratio of the storage pool, an increase ratio of the usage amount of the storage pool, the maximum value and an average value of the IOPS of the read requests to the storage pool, the maximum value and an average value of the MBPS of the read requests to the storage pool, the maximum value and an average value of the IOPS of the write requests to the storage pool, the maximum value and an average value of the MBPS of the write requests to the storage pool, and an operation ratio of the storage pool.

The storage system 30 consults the obtained monitoring data and determines whether or not the storage pool of the target device is to be migrated by consulting planning data.

A description will now be given of the planning.

After obtaining the monitoring data, the storage system 30 carries out the planning based on the monitoring data.

More specifically, the storage system 30 consults planning data set in advance based on the obtained monitoring data, and determines whether or not the storage pool is migrated, and what characteristics of a storage pool the storage pool of the target device is to be migrated to when the storage pool 60 is migrated.

It should be noted that characteristics of a storage system 30 for the subject data may be determined according to an instruction of the administrator or the like regardless of the monitoring data, and the migration may be carried out to a storage pool meeting the determined characteristics.

FIGS. 23 and 24 (FIGS. 23A to 24H) are explanatory diagrams of planning data.

In the storage system 30, the disk migration program 3519 determines a migration of a storage pool according to planning data based on obtained monitoring data. Alternatively, the disk migration program 3519 migrates the storage pool according to planning data set in advance based on an instruction of the administrator or the like.

FIG. 23 shows planning data used when a storage pool is migrated based on an instruction from the administrator. FIGS. 24A to 24H show planning data used when a storage pool is migrated based on obtained monitoring data. These planning data are collectively stored in the configuration information 351 in the memory 350 in advance.

FIG. 23 shows the planning data used when characteristics to be allocated to a subject target device are determined based on an instruction of the administrator, and the migration is carried out to a storage pool meeting the determined characteristics.

The administrator consults the planning data shown in FIG. 23A, and determines how the target device subject to the planning is configured.

Then, when the subject target device is allocated to a real area (namely target device is set by first-type LDEVs constituted of PDEVs), the administrator consults real area allocation demand in FIG. 23B, and determines contents of processing corresponding to the specified demand. For example, when there is a strong demand for allocation to a real area, entire migration to a real area is carried out, namely all data in the target device are migrated to a real area.

When the subject target device is to have the sequential configuration, the administrator consults a sequential configuration demand in FIG. 23C, and determines contents of processing corresponding to a specified demand. For example, when the sequential configuration demand is a medium degree, there is determined to migrate the target device to a storage pool with a sequential configuration. According to this determination, the disk migration program 3519 of the storage system 30 executes processing to migrate the target device to a storage pool with the sequential configuration.

When an access performance of the subject target device is to be changed, the administrator consults a performance demand in FIG. 23D, and determines contents of processing corresponding to a specified demand. For example, when the access performance demand is high, it is determined to migrate the target device to a storage pool with the FC connection. According to this determination, the disk migration program 3519 of the storage system 30 executes processing to migrate the target device to a storage pool with the FC connection.

When a reliability of the subject target device is to be changed, the administrator consults a reliability demand in FIG. 23E, and determines contents of processing corresponding to a specified demand. For example, when the reliability demand is middle, it is determined to migrate the target device to a storage pool with the EDEV. According to this determination, the disk migration program 3519 of the storage system 30 executes processing to migrate the target device to a storage pool with the EDEV.

When an availability of the subject target device is to be changed, the administrator consults a high availability demand in FIG. 23F, and determines contents of processing corresponding to a specified demand. For example, when the availability demand is high, it is determined to subject the target device to remote copy with an external storage system. According to this determination, the disk migration program 3519 of the storage system 30 executes processing to subject the target device to remote copy with an external storage system.

FIGS. 24A to 24H each show the planning data used for the storage system 30 to determine whether or not the storage pool of the target device is migrated and what characteristics of a storage pool the storage pool is to be migrated to when the storage pool is migrated.

For example, in a case shown in FIG. 24A where first-type LDEVs constituting a storage pool associated with a target device have characteristic that the sequential ratio is high, the cache hit ratio of areas allocated to the storage pool 60 is high, the write hit ratio of the cache is high, the dirty ratio of the cache is high, and the utilization ratio of the storage pool 60 is high, and also there are a large number of areas which exceed a sequential space allocation threshold of the first-type LDEVs (level: high), the storage pool associated with the target device is migrated to other storage pool with a low access frequency and a sequential characteristic, or data stored in the storage pool are migrated to real areas (real area migration).

In a case shown in FIG. 24B where first-type LDEVs constituting a storage pool associated with a target device have characteristic that the sequential ratio is high, the cache hit ratio of areas allocated to the storage pool 60 is high, the write hit ratio of the cache is high, the dirty ratio of the cache is high, and the utilization ratio of the storage pool 60 is high, and also there are a small number of areas which exceed a sequential space allocation threshold of the first-type LDEVs (level: low), part of the data of the storage pool associated with the target device are migrated to real areas.

In a case shown in FIG. 24C where first-type LDEVs constituting a storage pool associated with a target device have characteristic that the sequential ratio is high, the cache hit ratio of areas allocated to the storage pool is high, the write hit ratio of the cache is high, the dirty ratio of the cache is high, and the utilization ratio of the storage pool is high, and also there are a large number of areas which exceed a sequential space allocation threshold of the first-type LDEVs (level: high), the storage pool associated with the target device is migrated to other storage pool with a low access frequency and a random characteristic, or data stored in the storage pool are migrated to real areas.

In a case shown in FIG. 24D where first-type LDEVs constituting a storage pool associated with a target device have characteristic that the sequential ratio is high, the cache hit ratio of areas allocated to the storage pool is low, the write hit ratio of the cache is high, the dirty ratio of the cache is high, and the utilization ratio of the storage pool is high, and also there are a large number of areas which exceed a sequential space allocation threshold of the first-type LDEVs (level: high), the data stored in the storage pool associated with the target device are migrated to real areas.

Further, FIGS. 24E to 24H show examples of planning data for migrations to an externally connected device and a device with a different connection form in the migration of a storage pool.

For example, in a case shown in FIG. 24E where first-type LDEVs constituting a storage pool associated with a target device have characteristic that the sequential ratio is high, the cache hit ratio of areas allocated to the storage pool is high, the write hit ratio of the cache is high, the dirty ratio of the cache is high, and the utilization ratio of the storage pool is high, and also there are a large number of areas which exceed a sequential space allocation threshold of the first-type LDEVs (level: high), the storage pool associated with the target device is migrated to other storage pool with a low access frequency and a sequential characteristic, or data stored in the storage pool are migrated to PDEVs or EDEVs connected via the ATA (real area migration).

In a case shown in FIG. 24F where first-type LDEVs constituting a storage pool associated with a target device have characteristic that the sequential ratio is high, the cache hit ratio of areas allocated to the storage pool is low, the write hit ratio of the cache is low, the dirty ratio of the cache is high, and the utilization ratio of the storage pool is high, and also there are a small number of areas which exceed a sequential space allocation threshold of the first-type LDEVs (level: low), part of the data of the storage pool associated with the target device are migrated to PDEVs or EDEVs connected via the ATA (real area migration).

In a case shown in FIG. 24G where first-type LDEVs constituting a storage pool associated with a target device have characteristic that the sequential ratio is high, the cache hit ratio of areas allocated to the storage pool is high, the write hit ratio of the cache is high, the dirty ratio of the cache is high, and the utilization ratio of the storage pool is high, and also there are a large number of areas which exceed a sequential space allocation threshold of the first-type LDEVs (level: high), the storage pool associated with the target device is migrated to other storage pool with a low access frequency and a random characteristic, or data stored in the storage pool are migrated to PDEVs or EDEVs connected via the ATA (real area migration).

In a case shown in FIG. 24H where first-type LDEVs constituting a storage pool associated with a target device have characteristic that the sequential ratio is high, the cache hit ratio of areas allocated to the storage pool is low, the write hit ratio of the cache is high, the dirty ratio of the cache is high, and the utilization ratio of the storage pool is high, and also there are a large number of areas which exceed a sequential space allocation threshold of the first-type LDEVs (level: high), the data stored in the storage pool associated with the target device are migrated to PDEVs or EDEVs connected via the ATA (real area migration).

FIGS. 25A to 25D are explanatory diagrams of how a storage pool set to a target device is migrated.

Figure 25A:
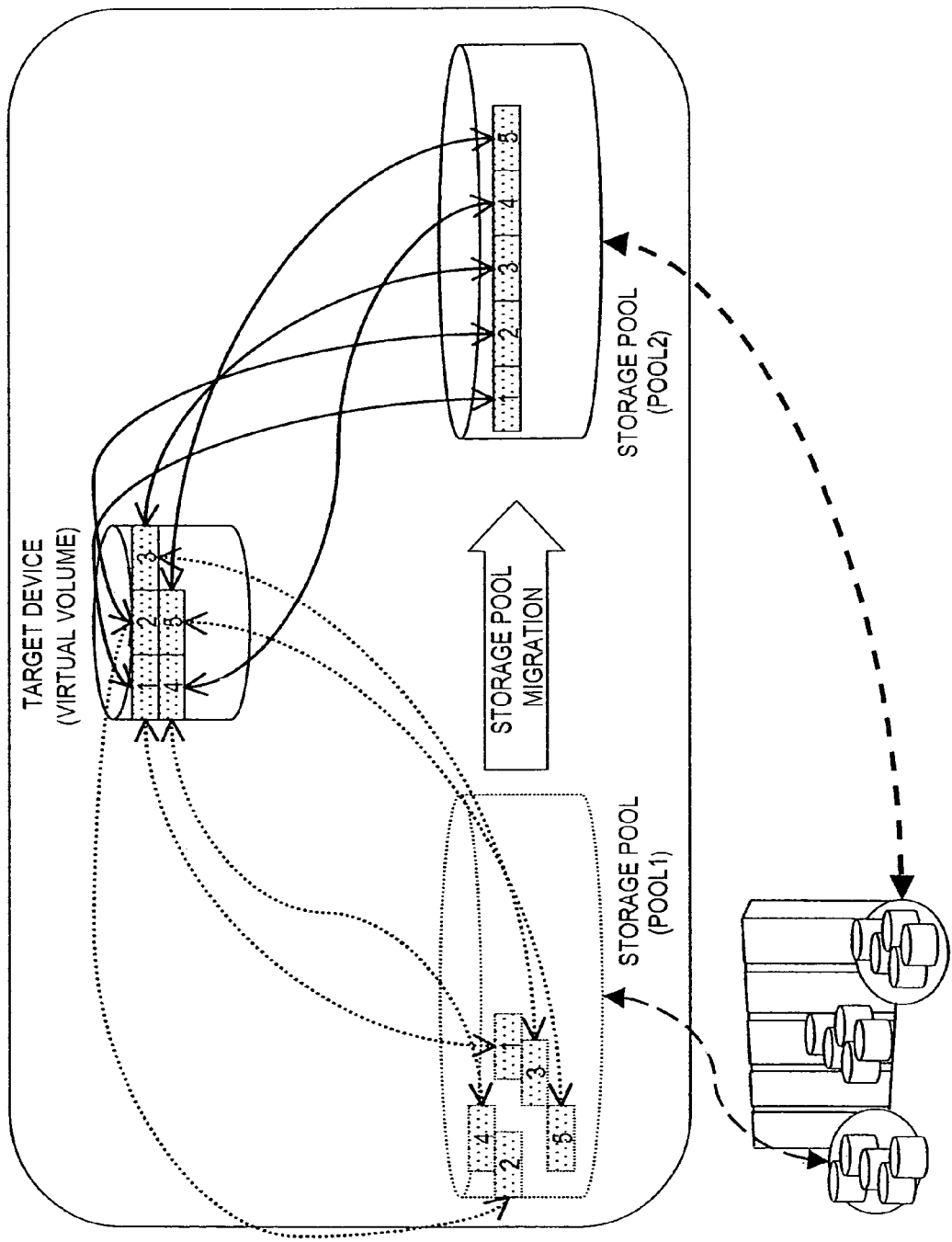
FIG. 25A is an explanatory diagram of an example of how a storage pool set to a target device is migrated according to the embodiment of this invention.

FIG. 25A is an explanatory diagram for a case where a storage pool POOL1 with the random characteristic associated with a target device is migrated to a storage pool with the sequential characteristic.

As described in FIGS. 13 and 14, when a storage pool has the random characteristic, and a large number of data exceeding the block size of first LDEVs constituting the storage pool, the access performance of the data can be increased by migrating the storage pool allocated to the target device to a storage pool with the sequential characteristic.

Figure 25B:
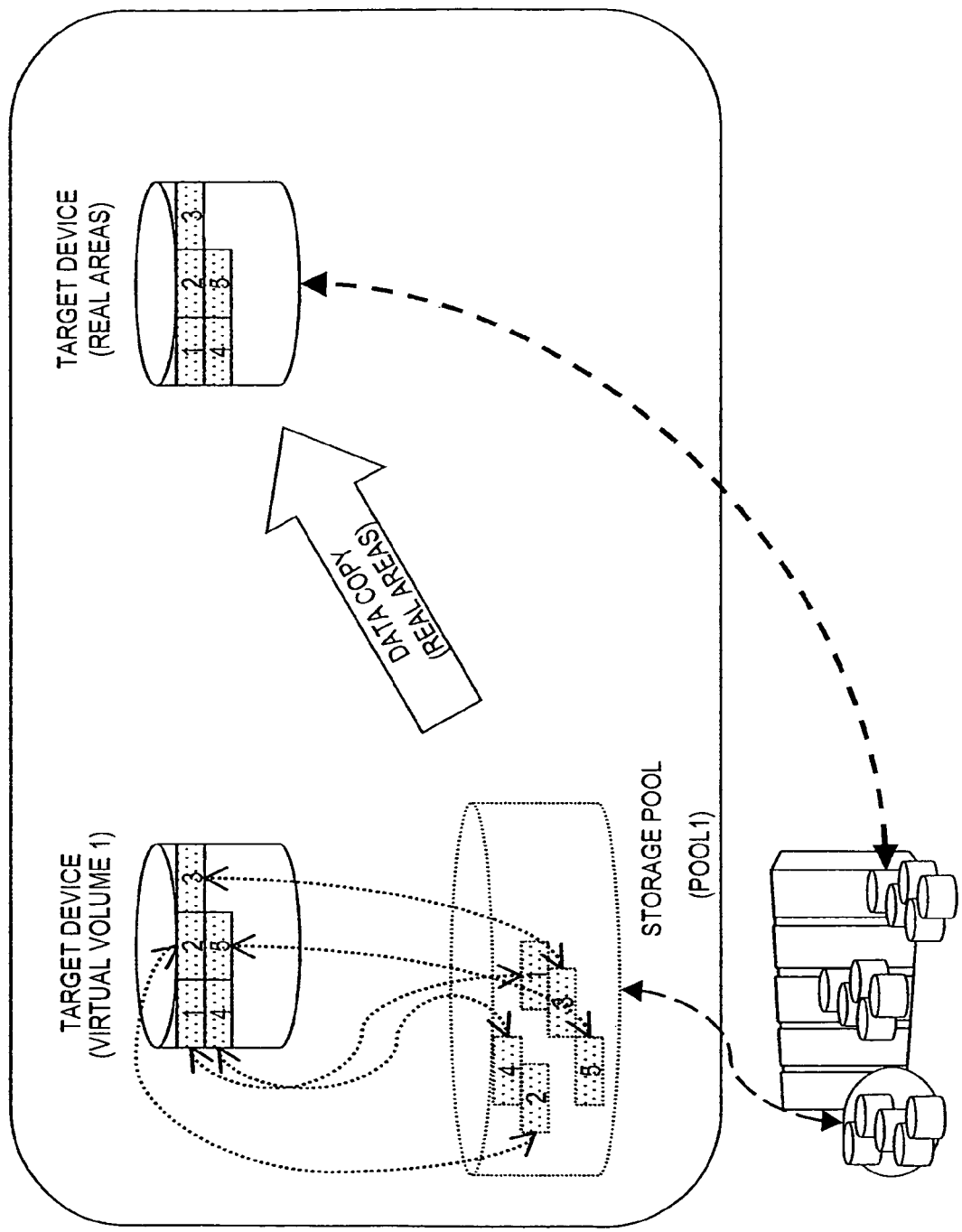
FIG. 25B is an explanatory diagram of an example of how a storage pool set to a target device is migrated according to the embodiment of this invention.

FIG. 25B is an explanatory diagram for a case where a storage pool POOL1 associated with a target device is migrated to a target device directly allocated to first-type LDEVs.

Figure 17:
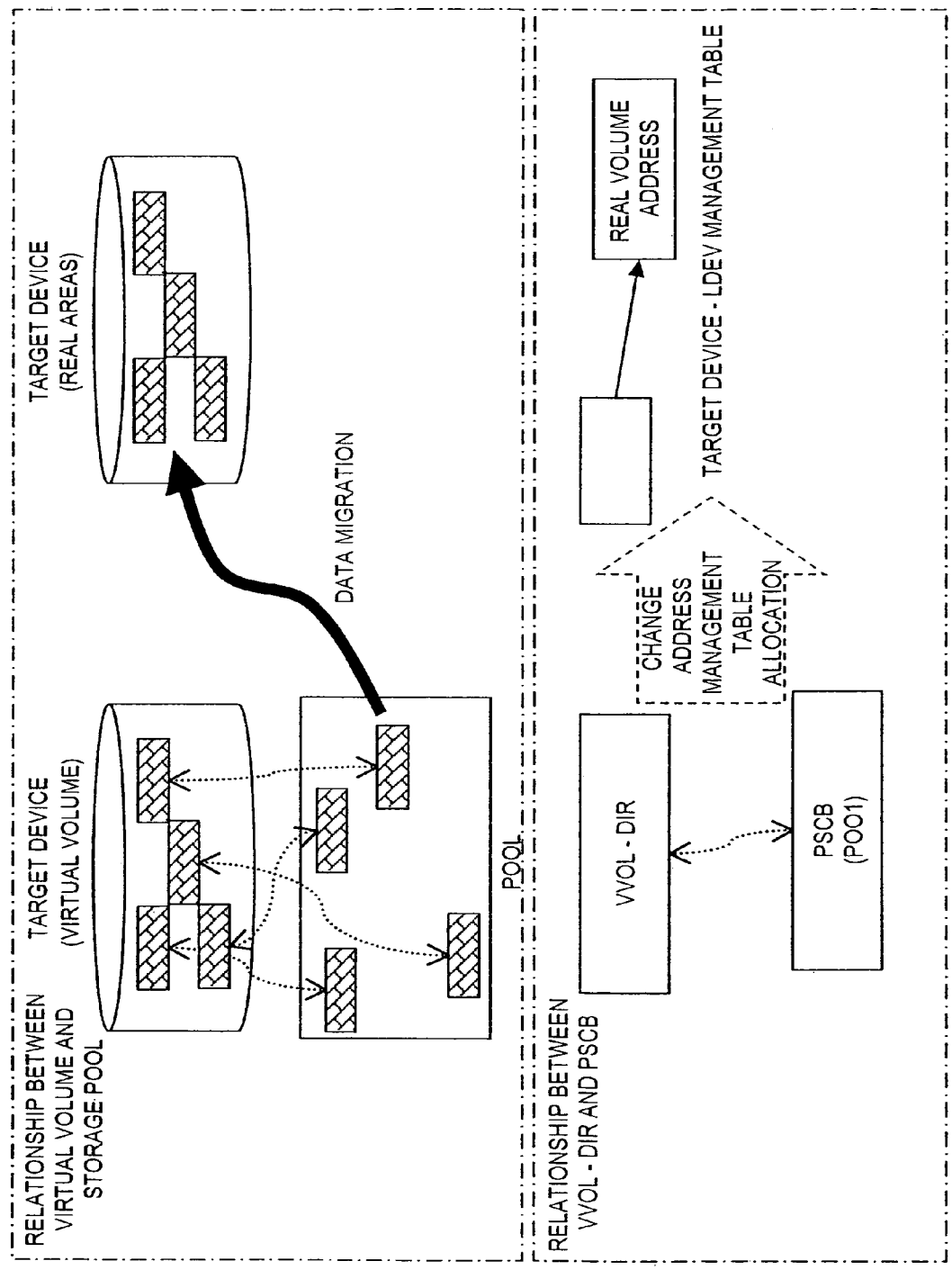
FIG. 17 is an explanatory diagram of still another example of the migration of the storage pool according to the embodiment of this invention.

As described in FIGS. 17 and 18, data stored in the storage pool are moved to a real area, and the storage pool is released. In this way, the access frequency to data decreases, and the data can be directly stored in first-type LDEVs for a case where the data are migrated to a tape device, an archive volume, or the like, or for other applications.

Figure 25C:
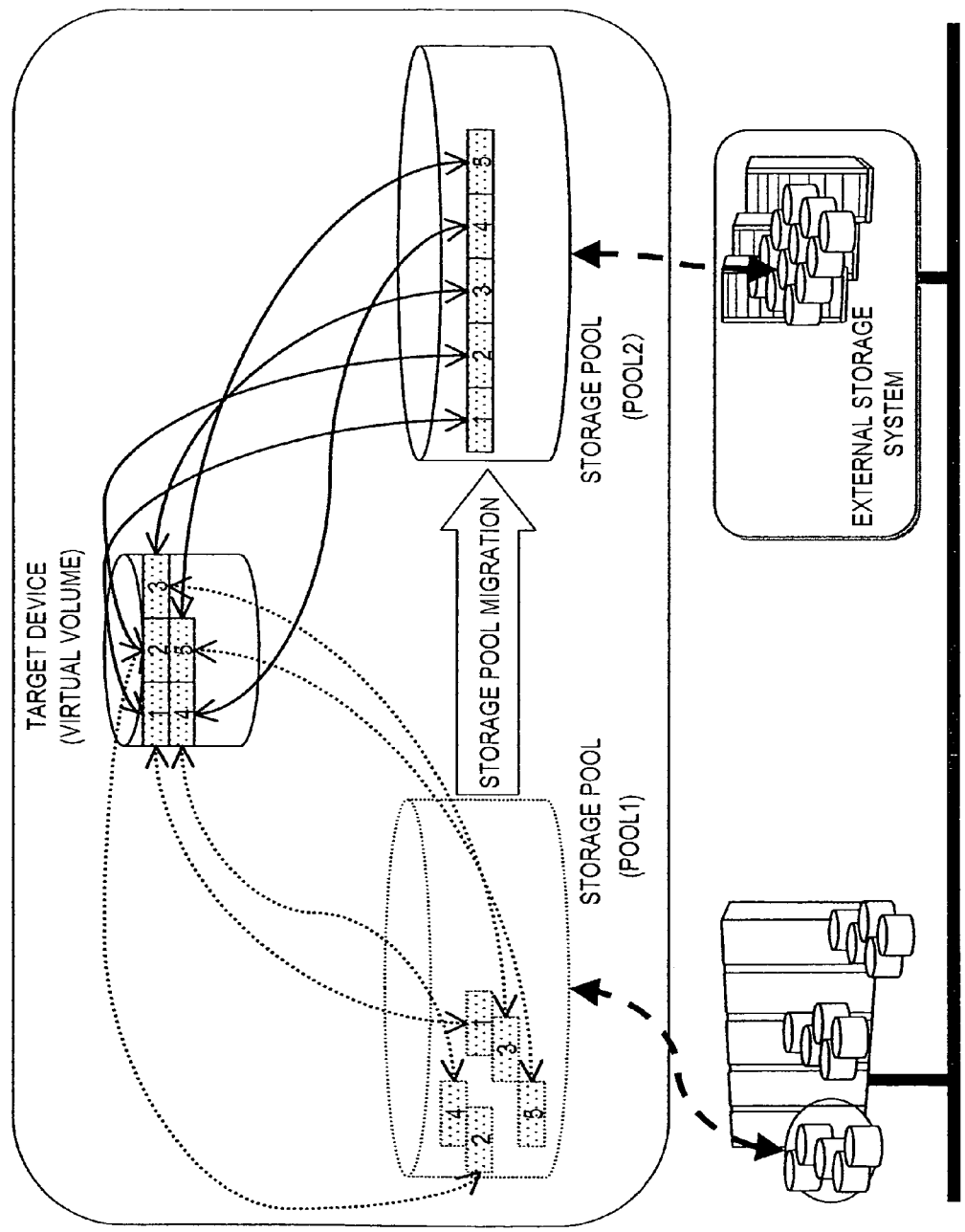
FIG. 25C is an explanatory diagram of an example of how a storage pool set to a target device is migrated according to the embodiment of this invention.

FIG. 25C is an explanatory diagram for a case where a storage pool POOL1 associated with a target device is migrated to a storage pool POOL2 constituted of external devices (EDEVs) of other storage system.

As described above in FIG. 11, the characteristics of a storage pool include the connection interface and the installation form in addition to the configurations of the storage pool 60 such as the random/sequential configurations. With these characteristics, it is possible to migrate, for example, from a storage pool configured of first-type LDEVs set inside the storage system 30 to a storage pool constituted of external physical devices. This processing is carried out by copying data and changing the allocation between the VVOL-DIR 3523 and PSCBs 3524 as described above.

It should be noted that, in a similar manner, it is possible to carry out a migration of data from a disk device with the FC connection to a disk device with the ATA connection, a migration of data to a remote storage system, and the like.

Figure 25D:
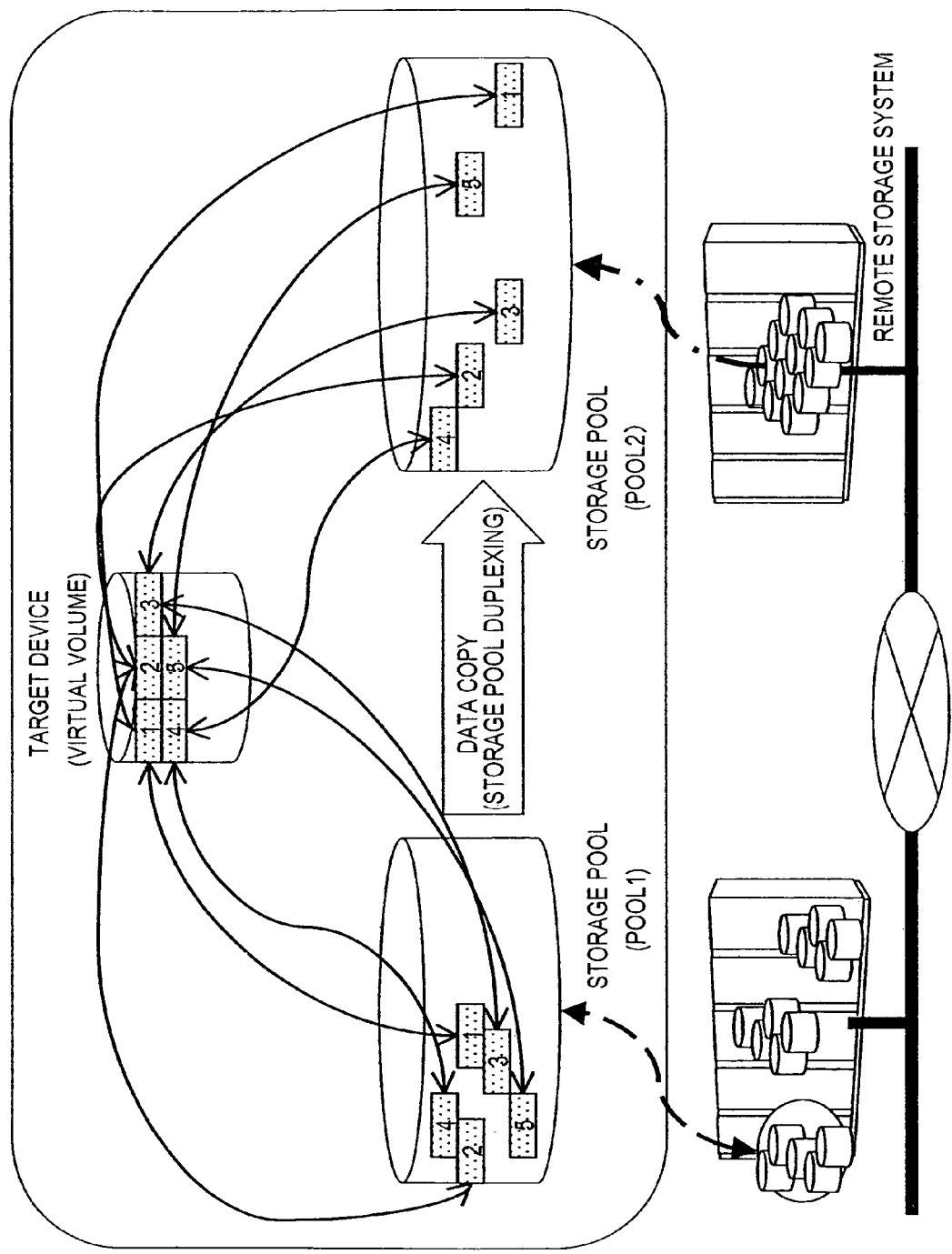
FIG. 25D is an explanatory diagram of an example of how a storage pool set to a target device is migrated according to the embodiment of this invention.

FIG. 25D is an explanatory diagram for a case where a storage pool POOL1 associated with a target device is copied to a storage pool POOL2 constituted of external devices (EDEVs) of a remote storage system, thereby duplexing the target device.

The description has been given of the cases where a storage pool allocated to a target device is migrated to other storage pool or other areas. Other than these cases, it is also possible to further associate another storage pool with the target device while maintaining an association between a target device and a storage pool.

More specifically, multiple PSCB pointers which have already been allocated are stored in each of the entries of the VVOL-DIR 3523. In this way, when an I/O request to the target device is issued, the I/O request is processed simultaneously for multiple allocated storage pools by consulting the entries of the VVOL-DIR 3523. As a result, data in the target device are stored in the primary storage system 30 and the remote storage system 900 in the duplexed manner. As a result, there is provided a storage system with a high availability.

It should be noted that, in order to execute the processing shown in FIG. 25D, it is necessary to set the configuration of storage areas of the remote storage system 900 to be the same as that of the storage system 30. In order to do so, system configuration information of the storage system 30 is transmitted to the remote storage system 900 in advance, and the storage system 900 builds configurations such as the logical devices and the virtual volume based on the information.

Figure 26:
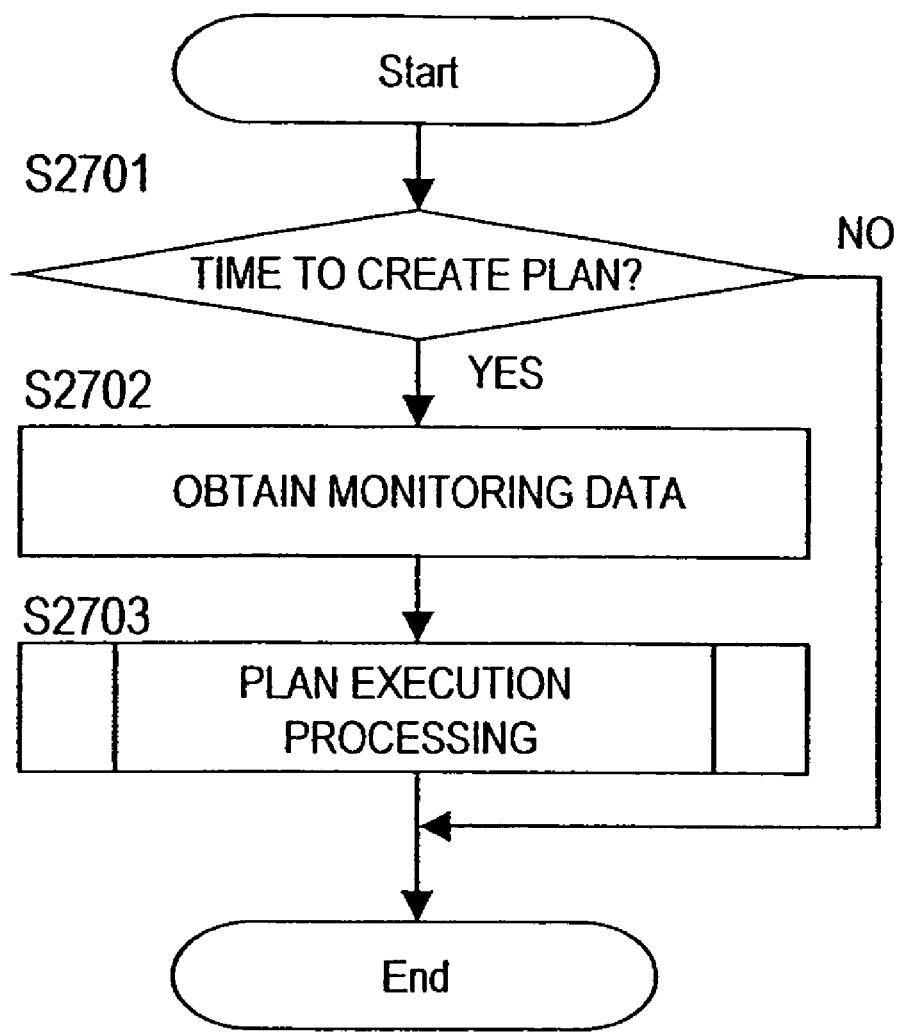
FIG. 26 is a flow chart of processing to create a plan by obtaining the monitoring data according to the embodiment of this invention.

FIG. 26 is a flow chart of planning execution processing by obtaining the monitoring data.

In the storage system 30, the disk migration program 3519 determines whether not the present time is to obtain monitoring data, and to execute planning based on the obtained monitoring data (S2701). It should be noted that the execution of the planning may be periodically at a predetermined interval or the time for the execution may be determined according to an instruction of the administrator or the like.

When the disk migration program 3519 determines that it is time to create the plan, the disk migration program 3519 proceeds to a step S2702. On the other hand, when the disk migration program 3519 determines that it is not time to execute the planning, the disk migration program 3519 ends the processing.

In the step S2702, the disk migration program 3519 obtains monitoring data related to a subject target device. More specifically, the disk migration program 3519 is obtaining statistical information at an interval of a predetermined unit time for respective storage pools. The disk migration program 3519 obtains the monitoring data, and further obtains information by statistically processing the monitoring data.

Then, the disk migration program 3519 executes plan execution processing (S2703). When this plan execution processing ends, the disk migration program 3519 ends the processing of this flow chart.

Figure 27:
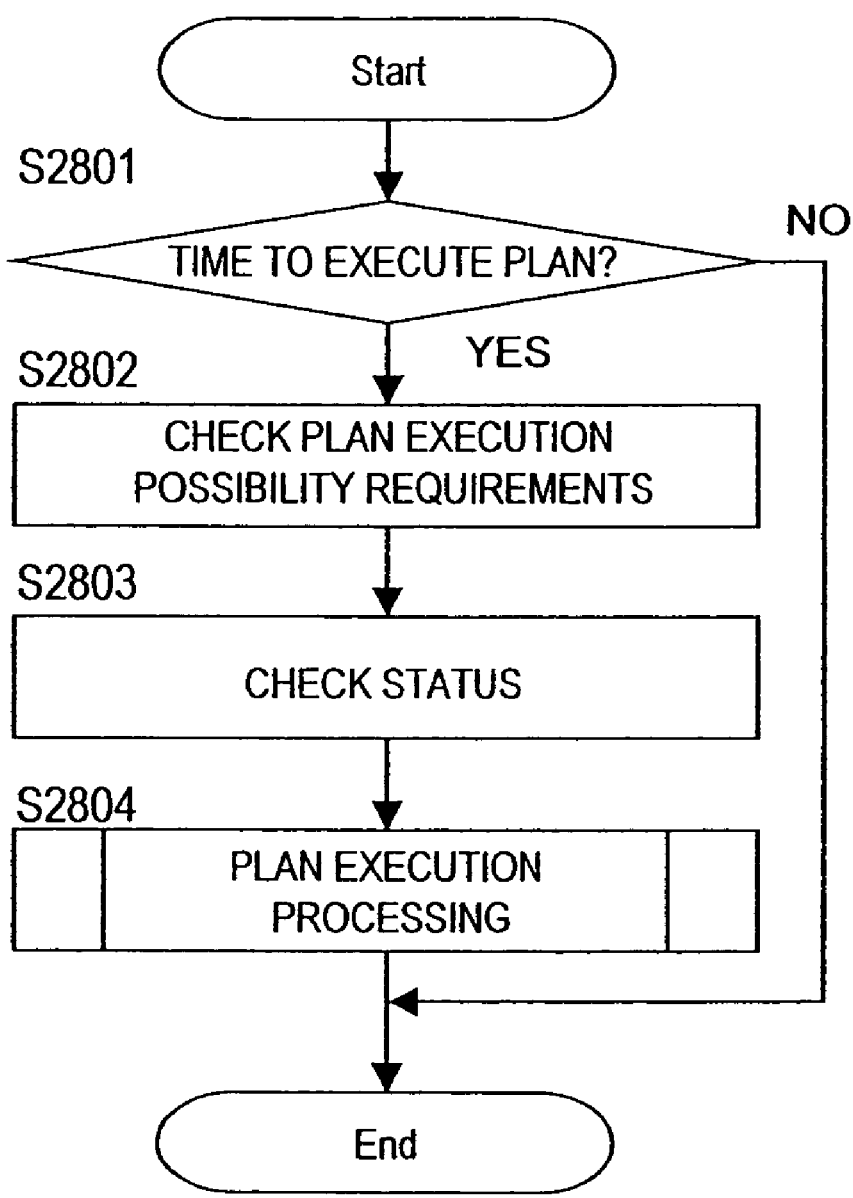
FIG. 27 is flow chart of planning execution processing according to the embodiment of this invention.

FIG. 27 is a flow chart of the plan execution processing.

First, the disk migration program 3519 determines whether or not it is time to execute the plan (S2801). Namely, the disk migration program 3519 determines whether or not it is time to execute the plan based on the monitoring data obtained by the above-described processing of FIG. 26. The plan may be executed immediately after the processing of FIG. 26, or at a predetermined timing.

When the disk migration program 3519 determines that it is time to execute the plan, the disk migration program 3519 proceeds to a step S2802. On the other hand, when the disk migration program 3519 determines that it is not time to execute the plan, the disk migration program 3519 ends the processing.

In the step S2802, the disk migration program 3519 consults planning data based on the obtained monitoring data, and determines whether to execute a plan or not (to keep the target device as it is), and which planning data the processing is to be executed based on when a plan is executed.

Then, the disk migration program 3519 checks a present status of the target device subject to the processing (S2803). Then, the disk migration program 3519 executes the planning according to the above-described planning data. Namely, the disk migration program 3519 executes the migration processing of the storage pool allocated to the target device. Alternatively, the disk migration program 3519 ends the processing without migrating the target device (S2804).

The plan execution processing ends as described above.

As described above, the computer system according to the embodiment of this invention can associate the second-type LDEVs, which are virtual areas, with the first-type LDEVs constituted of PDEVs, which are physical devices, to use the second-type LDEVs as storage areas constituted of the physical devices. The host computer 10 accesses the second-type LDEVs as a target device. The association between the first-type LDEVs and the second-type LDEVs is set by allocating the PSCBs 3524 to the VVOL-DIR 3523. By changing allocation between the PSCBs 3524, and the VVOL-DIR 3523, storage areas of a virtual volume can dynamically be changed. In this way, it is possible to change the characteristics (such as the connection method, the connection interface, and the installation form) of the physical devices provided for the storage system 30 as necessary, thereby increasing degrees of freedom of the access to the data in the computer system.

This invention includes the following embodiment modes as examples.

(Eighteenth embodiment mode) The above storage system wherein at least the first first-type logical device and the second first-type logical device includes a storage area of a storage device included in a chassis of the storage system.

(Nineteenth embodiment mode) The above storage system further comprising:

a primary storage system; and a secondary storage system that is externally connected to the primary storage system, wherein at least the first first-type logical device and the second first-type logical device includes a storage area of a storage system included in the external storage system.

(Twentieth embodiment mode) The above storage system wherein at least the first first-type logical device and the second first-type logical device includes a storage area of a storage device using a tape type recording medium.

(Twenty-first embodiment mode) The above storage system wherein at least the first first-type logical device and the second first-type logical device includes a storage area of a storage device connected via the ATA interface.

(Twenty-second embodiment mode) The above storage system wherein at least the first first-type logical device and the second first-type logical device includes a storage area of a storage device connected via the Fibre Channel interface.

(Twenty-third embodiment mode) The above storage system wherein at least the first first-type logical device and the second first-type logical device includes a storage area that stores data divided into predetermined size in sequential areas.

(Twenty-fourth embodiment mode) The above storage system wherein at least the first first-type logical device and the second first-type logical device includes a storage area that provides a parallel access to data divided into predetermined size.

(Twenty-fifth embodiment mode) A storage system connected to a computer and a management computer, comprising:

storage devices accessed by the computer; and a control unit for controlling the storage devices, wherein a first first-type logical device that is a storage area corresponding to a storage area set in at least one of the storage devices, a second first-type logical device that is different from the first first-type logical device in a characteristic and is a storage area corresponding to a storage area set in at least one of the storage devices, and a second-type logical device that is a virtual storage area are provided, and wherein the control unit:

sets the first first-type logical device and the second first-type logical device as storage areas included in a storage pool through mapping;

sets the second-type logical device to be able to store data by allocating the storage area of the first first-type logical device to the storage area of the second-type logical device;

sets the second-type logical device to be accessible by the computer;

obtains an access characteristic from the computer to the second-type logical device, and the characteristic of the storage area of the first-type logical device;

compares the obtained access characteristic and the obtained characteristic of the storage area to predetermined conditions;

when the predetermined conditions are satisfied in the comparison, copies data stored in the first first-type logical device allocated to the storage area of the second-type logical device of the access destination to the second first-type logical device;

releases the allocation of the storage area of the second-type logical device of the access destination to the storage area of the first first-type logical device; and changes the characteristic of the second-type logical device by allocating the storage area of the second-type logical device of the access destination to the storage area of the second first-type logical device.

(Twenty-sixth embodiment mode) The above storage system wherein the first first-type logical device includes a storage area that provides a parallel access to data divided into predetermined size, and the second first-type logical device includes a storage area that stores data divided into predetermined size in sequential storage areas.

(Twenty-seventh embodiment mode) The above storage system further comprising:

a primary storage system; and a secondary storage system externally connected to the primary storage system, wherein the first first-type logical device includes a storage area of a storage device included in the primary storage system, and wherein the second first-type logical device includes a storage area of a storage device included in the external storage system.

(Twenty-eighth embodiment mode) A storage system connected to a computer and a management computer, comprising:

storage devices accessed by the computer; and a control unit for controlling the storage devices, wherein a first first-type logical device that is a storage area corresponding to a storage area set in at least one of the storage devices, a second first-type logical device that is different from the first first-type logical device in a characteristic and is a storage area corresponding to a storage area set in at least one of the storage devices, and a second-type logical device that is a virtual storage area are provided, and wherein the control unit:

sets the first first-type logical device as a storage area of a storage pool through mapping;

sets the second-type logical device to be able to store data by allocating the storage area of the first first-type logical device to the storage area of the second-type logical device;

sets the second-type logical device to be accessible by the computer;

when an access characteristic from the computer to the second-type logical device satisfies a predetermined condition, copies data stored in the first first-type logical device allocated to the storage area of the second logical device of the access destination to the second first-type logical device which is not set as a storage area of the storage pool;

releases the allocation of the storage area of the second-type logical device of the access destination to the storage area of the first first-type logical device; and changes the characteristic of the second-type logical device by allocating the storage area of the second-type logical device of the access destination to the storage area of the second first-type logical device.

(Twenty-ninth embodiment mode) A storage system connected to a computer and a management computer, comprising:

storage devices accessed by the computer; and a control unit for controlling the storage devices, wherein the storage system comprises a primary storage system; and a secondary storage system externally connected to the primary storage system, wherein a first first-type logical device that is a storage area corresponding to a storage area set in at least one of the storage devices, a second first-type logical device that is different from the first first-type logical device in a characteristic and is a storage area corresponding to a storage area set in at least one of the storage devices, and a second-type logical device that is a virtual storage area are provided, and wherein the control unit:

sets the first first-type logical device and the second first-type logical device as storage areas included in a storage pool through mapping;

sets the second-type logical device to be able to store data by allocating the storage area of the first first-type logical device to the storage area of the second-type logical device;

sets the second-type logical device to be accessible by the computer; and when an access characteristic from the computer to the second-type logical device satisfies a predetermined condition, changes a part of the storage area of the second-type logical device by, without releasing the allocation of the storage area of the second-type logical device to the storage area of the first first-type logical device, further allocating the storage area of the second-type logical device to the storage area of the second first-type logical device.

While the present invention has been described in detail and pictorially in the accompanying drawings, the present invention is not limited to such detail but covers various obvious modifications and equivalent arrangements, which fall within the purview of the appended claims.

What is claimed is:

1. A storage system connected to a computer and a management computer, comprising:

storage devices accessed by the computer; and a control unit for controlling the storage devices, wherein a first-type logical device that is a storage area corresponding to a storage area set in at least one of the storage devices and includes a first first-type logical device and a second first-type logical device different in a characteristic, and a second-type logical device that is a virtual storage area are provided, and wherein the control unit:

sets at least two of the first-type logical devices as storage areas included in a storage pool through mapping;

sets the first-type logical device to be able to store data by not allocating a storage area of the second-type logical device to a storage area of the first first-type logical device first and, when the storage pool is accessed, allocating the storage area of the second-type logical device to the storage area of the first-type logical device in a pool slot mapped to the storage pool if the second-type logical device is not allocated in response to access to the second-type logical device from the computer;

sets the second-type logical device to be accessible by the computer if the storage area of the second type logical device is allocated in response to access to the second-type logical device from the computer;

changes the access characteristic of the second-type logical device by changing the allocated storage area of the second-type logical device to a storage area of the second first-type logical device.

2. The storage system according to claim 1, wherein the first-type logical device includes a storage area of a storage device provided inside a chassis of the storage system.

3. The storage system according to claim 1, further comprising:
a primary storage system; and
a secondary storage system that is externally connected to the primary storage system,
wherein the first-type logical device includes a storage area of a storage device provided for the external storage system.

4. The storage system according to claim 1, wherein the first-type logical device includes a storage area of a storage device using a tape type recording medium.

5. The storage system according to claim 1, wherein the first-type logical device includes a storage area of a storage device connected via an ATA interface.

6. The storage system according to claim 1, wherein the first-type logical device includes a storage area of a storage device connected via a Fibre Channel interface.

7. The storage system according to claim 1, wherein the first-type logical device includes a storage area that stores data divided into predetermined size in sequential storage areas.

8. The storage system according to claim 1, wherein the first-type logical device includes a storage area that provides a parallel access to data divided into predetermined size.

9. The storage system according to claim 1,
wherein the control unit:
sets the first first-type logical device and the second first-type logical device as storage areas of the storage pool through mapping;
copies data stored in the first first-type logical device allocated to the storage area of the second-type logical device to the second first-type logical device;
releases the allocation of the storage area of the second-type logical device to the storage area of the first first-type logical device; and
changes the characteristic of the second-type logical device by allocating the storage area of the second-type logical device to the storage area of the second first-type logical device.

10. The storage system according to claim 9,
wherein, when the storage area of the first first-type logical device is allocated to the storage area of the second-type logical device, the control unit:

obtains an access characteristic from the computer to the second-type logical device, and a characteristic of the storage area of the first-type logical device;
compares the obtained access characteristic and the obtained characteristic of the storage area to predetermined conditions; and
when the predetermined conditions are satisfied in the comparison, changes the characteristic of the second-type logical device by changing the allocation of the storage area of the second-type logical device of the access destination to the storage area of the second first-type logical device.

11. The storage system according to claim 1,
wherein the first first-type logical device stores data divided into predetermined size in a storage area accessible in parallel, and the second first-type logical device stores data divided into predetermined size in sequential storage areas, and
wherein the control unit:
sets the first first-type logical device and the second first-type logical device as storage areas of the storage pool through mapping;
copies data stored in the first first-type logical device allocated to the storage area of the second-type logical device to the second first-type logical device;
releases the allocation of the storage area of the second-type logical device to the storage area of the first first-type logical device; and
changes the characteristic of the second-type logical device by allocating the storage area of the second-type logical device to the storage area of the second first-type logical device.

12. The storage system according to claim 11,
wherein, when the storage area of the first first-type logical device is allocated to the storage area of the second-type logical device, the control unit:
obtains an access characteristic from the computer to the second-type logical device, and a characteristic of the storage area of the first first-type logical device;
compares the obtained access characteristic and the obtained characteristic of the storage area to predetermined conditions; and
when the predetermined conditions are satisfied in the comparison, changes the characteristic of the second-type logical device by changing the allocation of the storage area of the second-type logical device of the access destination to the storage area of the second first-type logical device.

13. The storage system according to claim 1, wherein the control unit:
sets the first first-type logical device as a storage area of the storage pool through mapping;
copies data stored in the first first-type logical device allocated to the storage area of the second-type logical device to the second first-type logical device that is not set as the memory area of the storage pool;
releases the allocation of the storage area of the second-type logical device to the storage area of the first first-type logical device; and
changes the characteristic of the second-type logical device by allocating the storage area of the second-type logical device to the storage area of the second first-type logical device.

14. The storage system according to claim 13,
wherein, when the storage area of the first first-type logical device is allocated to the storage area of the second-type logical device, the control unit:

obtains an access characteristic from the computer to the second-type logical device and a characteristic of the storage area of the first-type logical device;

compares the obtained access characteristic and the obtained characteristic of the storage area to predetermined conditions; and when the predetermined conditions are satisfied in the comparison, changes the characteristic of the second-type logical device by changing the allocation of the storage area of the second-type logical device of the access destination to the storage area of the second first-type logical device.

15. The storage system according to claim 1, comprising:

a primary storage system; and a secondary storage system externally connected to the primary storage system, wherein the first first-type logical device is constituted of the storage device provided in the primary storage system, and the second first-type logical device is constituted of the storage device provided in the secondary storage system, and wherein the control unit:

sets the first first-type logical device and the second first-type logical device as storage areas of the storage pool through mapping; and changes the characteristic of a part of the storage area of the second-type logical device by, without releasing the allocation of the storage area of the second-type logical device to the storage area of the first first-type logical device, further allocating the storage area of the second-type logical device to the storage area of the second first-type logical device.

16. The storage system according to claim 15, wherein, when the storage area of the first first-type logical device is allocated to the storage area of the second-type logical device, the control unit:

obtains an access characteristic from the computer to the second-type logical device, and a characteristic of the storage area of the first-type logical device;

compares the obtained access characteristic and the obtained characteristic of the storage area to predetermined conditions; and when the predetermined conditions are satisfied in the comparison, changes the characteristic of the second-type logical device by changing the allocation of the storage area of the second-type logical device of the access destination to the storage area of the second first-type logical device.

* * * * *